(12) United States Patent
Ahn

(10) Patent No.: US 8,111,363 B2
(45) Date of Patent: Feb. 7, 2012

(54) LIQUID CRYSTAL DISPLAY DEVICE AND FABRICATING METHOD THEREOF

(75) Inventor: Byung Chul Ahn, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/951,907

(22) Filed: Nov. 22, 2010

(65) Prior Publication Data

US 2011/0063556 A1   Mar. 17, 2011

Related U.S. Application Data

(62) Division of application No. 11/311,553, filed on Dec. 20, 2005, now Pat. No. 7,859,639.

(30) Foreign Application Priority Data

Dec. 24, 2004   (KR) .......................... 10-2004-0112578

(51) Int. Cl.
*G02F 1/1343* (2006.01)

(52) U.S. Cl. ....................................................... 349/141

(58) Field of Classification Search ................... 349/141
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,835,177 A | 11/1998 | Dohjo et al. | |
| 5,847,781 A | 12/1998 | Ono et al. | |
| 6,624,446 B2* | 9/2003 | Kim | ................................ 257/72 |
| 6,721,026 B2 | 4/2004 | Cheng et al. | |
| 6,741,312 B2* | 5/2004 | Komatsu | ........................ 349/141 |
| 2001/0005238 A1* | 6/2001 | Yun et al. | ......................... 349/43 |
| 2001/0007779 A1 | 7/2001 | Lee et al. | |
| 2001/0020994 A1 | 9/2001 | Kaneko et al. | |
| 2002/0085157 A1 | 7/2002 | Tanaka et al. | |
| 2002/0130324 A1 | 9/2002 | Song et al. | |

(Continued)

FOREIGN PATENT DOCUMENTS

JP   11-264993   9/1999

(Continued)

*Primary Examiner* — Mark Robinson
*Assistant Examiner* — Michael Inadomi
(74) *Attorney, Agent, or Firm* — McKenna Long & Aldridge, LLP

(57) ABSTRACT

A LCD device includes a gate line on a substrate and a data line crossing the gate line to define a pixel area; a thin film transistor source and drain electrodes; a common line parallel to the gate line; a common electrode extended from the common line and a pixel electrode extending from the drain electrode wherein the gate line and the common line have a first conductive layer group having at least double conductive layers, and the common electrode is formed by an extension of at least one transparent conductive layer of the common line; and the gate line, the source electrode and the drain electrode have a second conductive layer group having at least double conductive layers, and the pixel electrode is formed by an extension of at least one transparent conductive layer of the drain electrode.

18 Claims, 29 Drawing Sheets

U.S. PATENT DOCUMENTS

| | | | |
|---|---|---|---|
| 2003/0122982 A1* | 7/2003 | Shin et al. | 349/43 |
| 2004/0135955 A1* | 7/2004 | Hong | 349/141 |

FOREIGN PATENT DOCUMENTS

| | | |
|---|---|---|
| JP | 2001-250958 | 9/2001 |
| JP | 2002-090779 | 3/2002 |
| JP | 2004-518173 | 6/2004 |
| KR | 1999-0031218 | 5/1999 |
| KR | 10-2000-0050883 | 8/2000 |
| KR | 10-0325079 | 2/2002 |
| KR | 10-2002-0071049 | 9/2002 |
| KR | 10-2004-0086927 | 10/2004 |

* cited by examiner

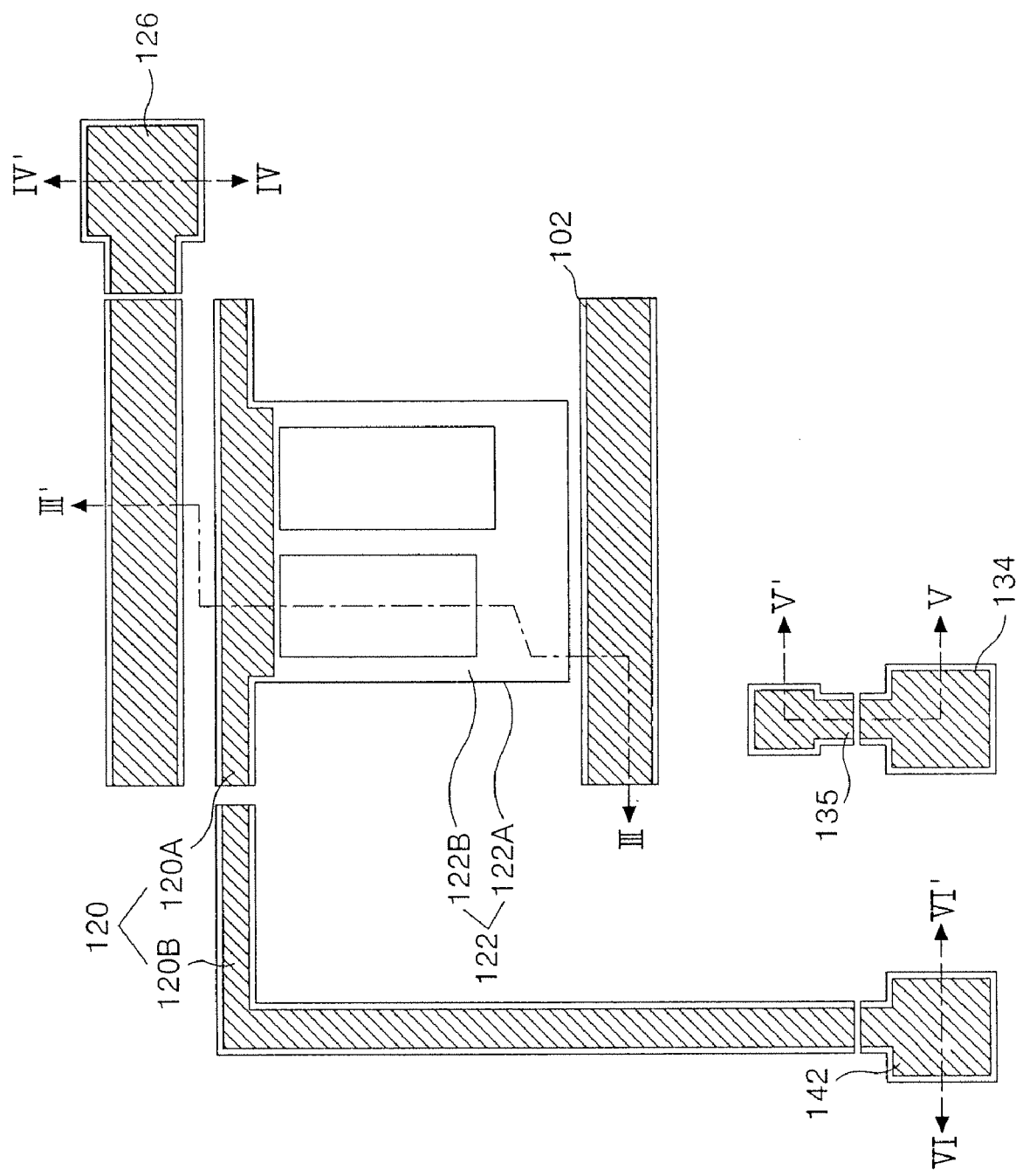

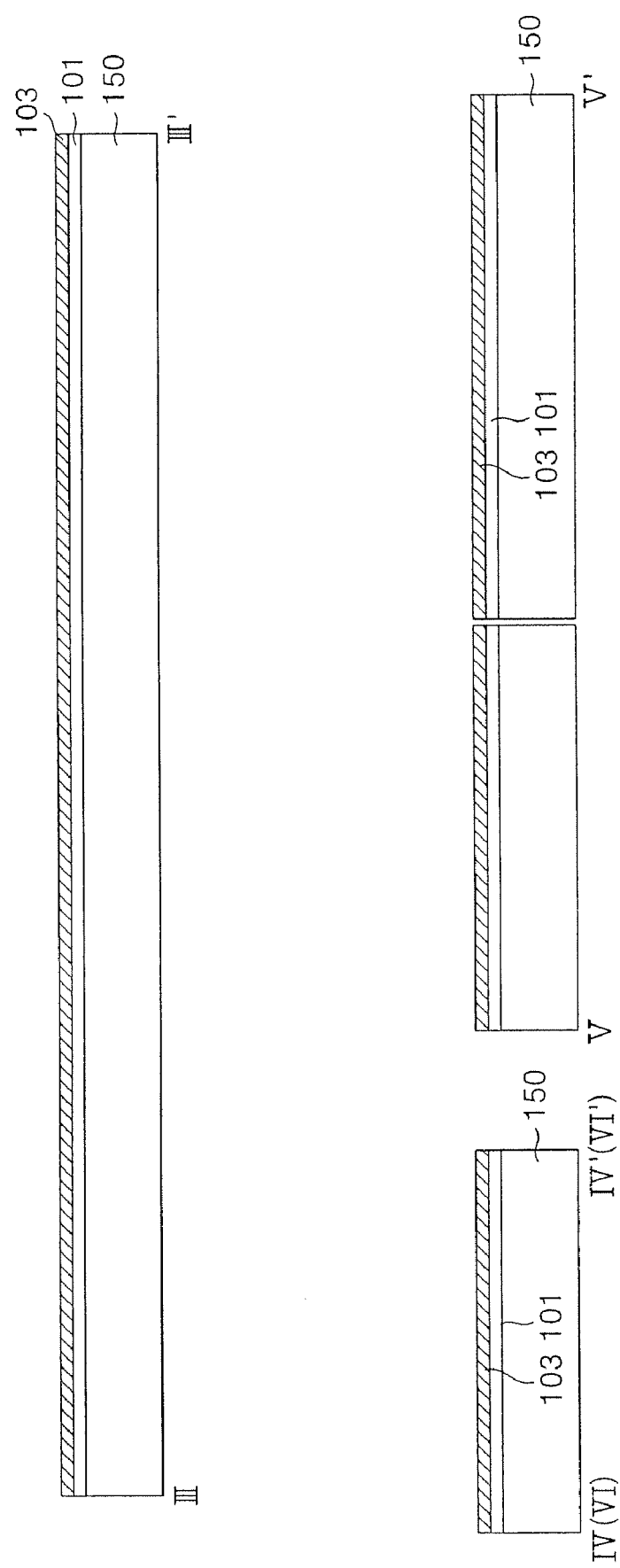

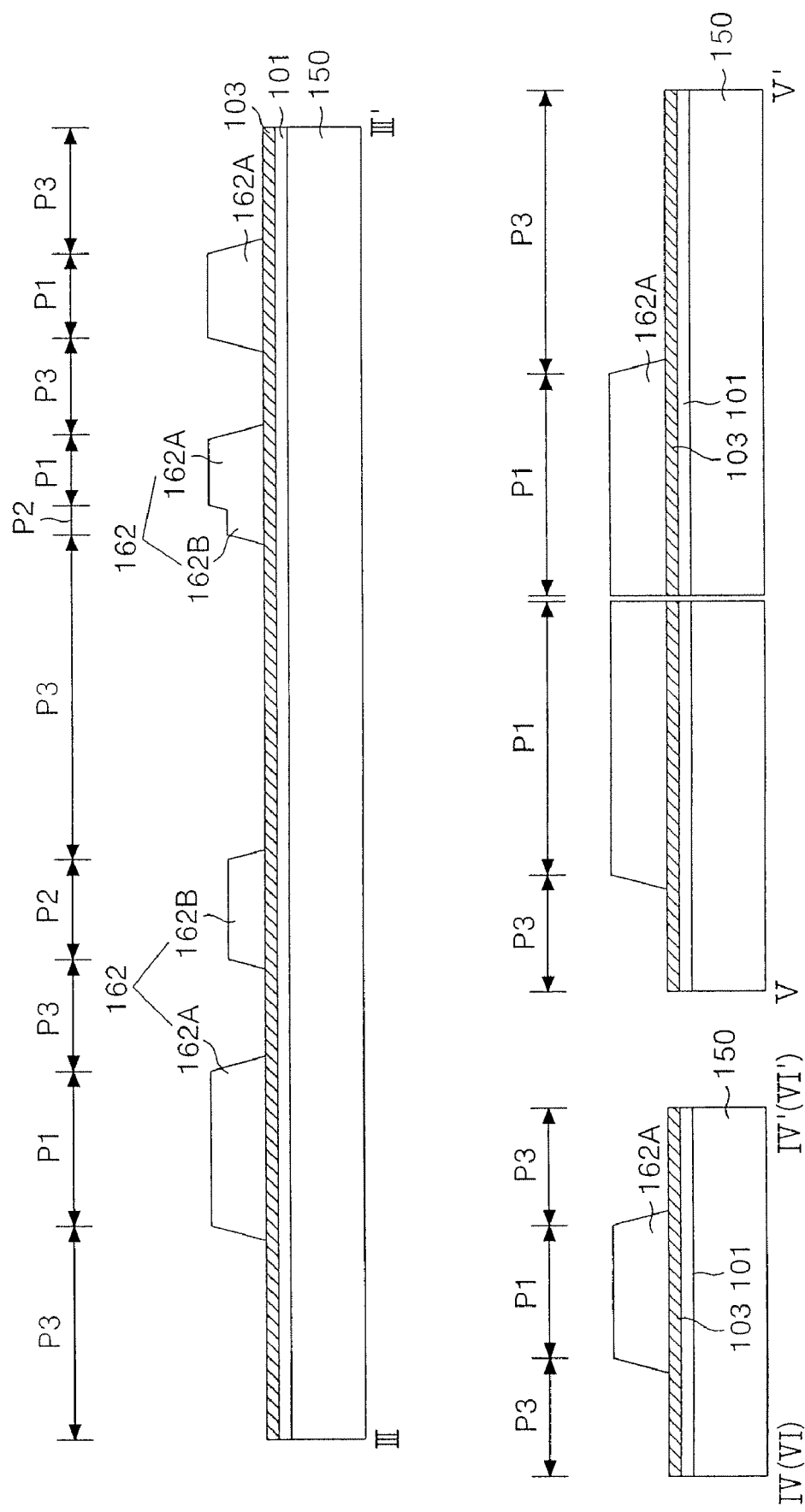

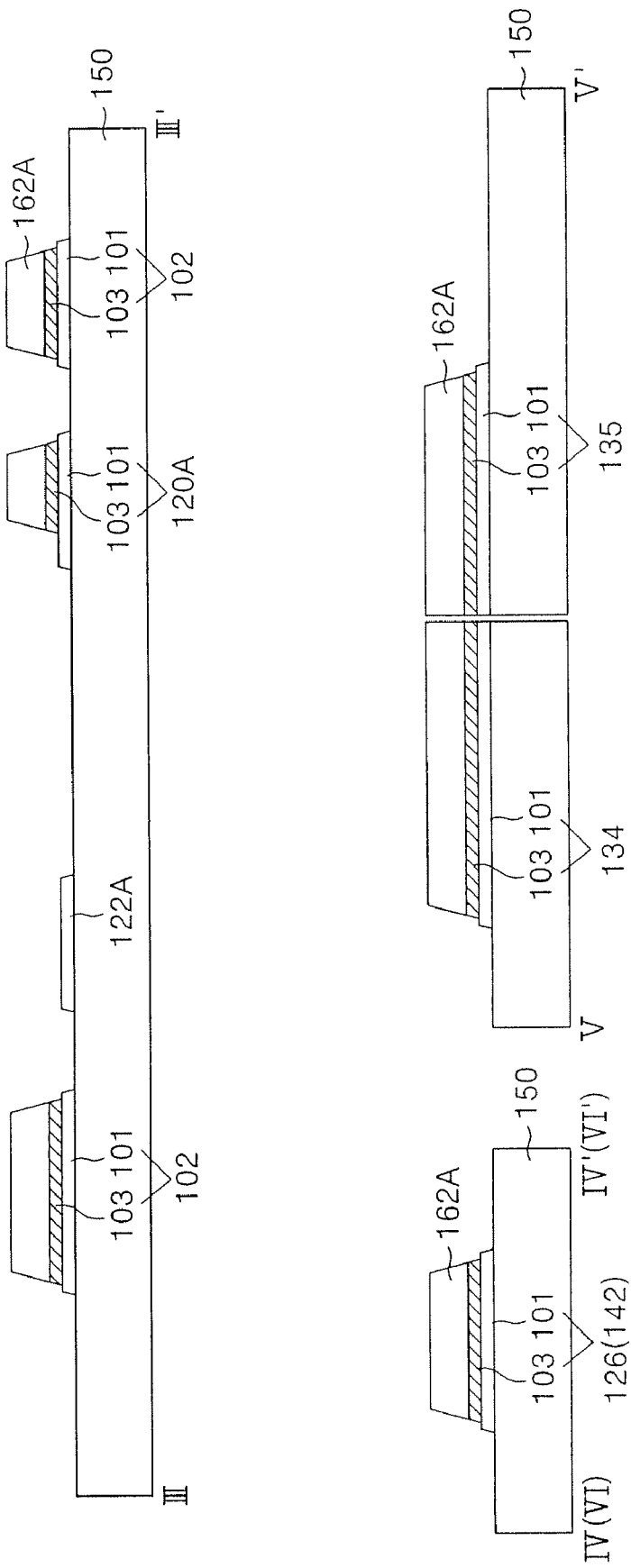

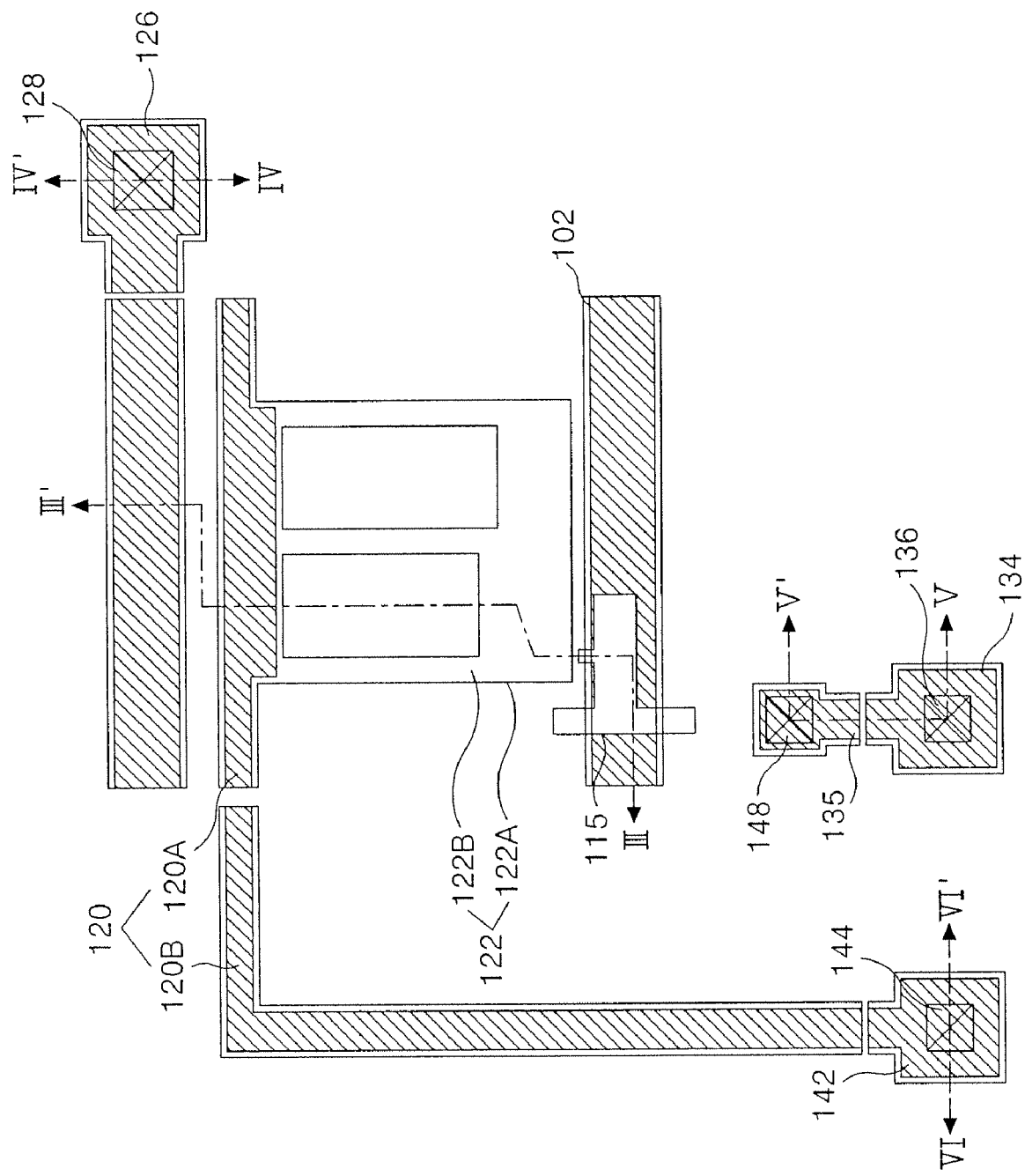

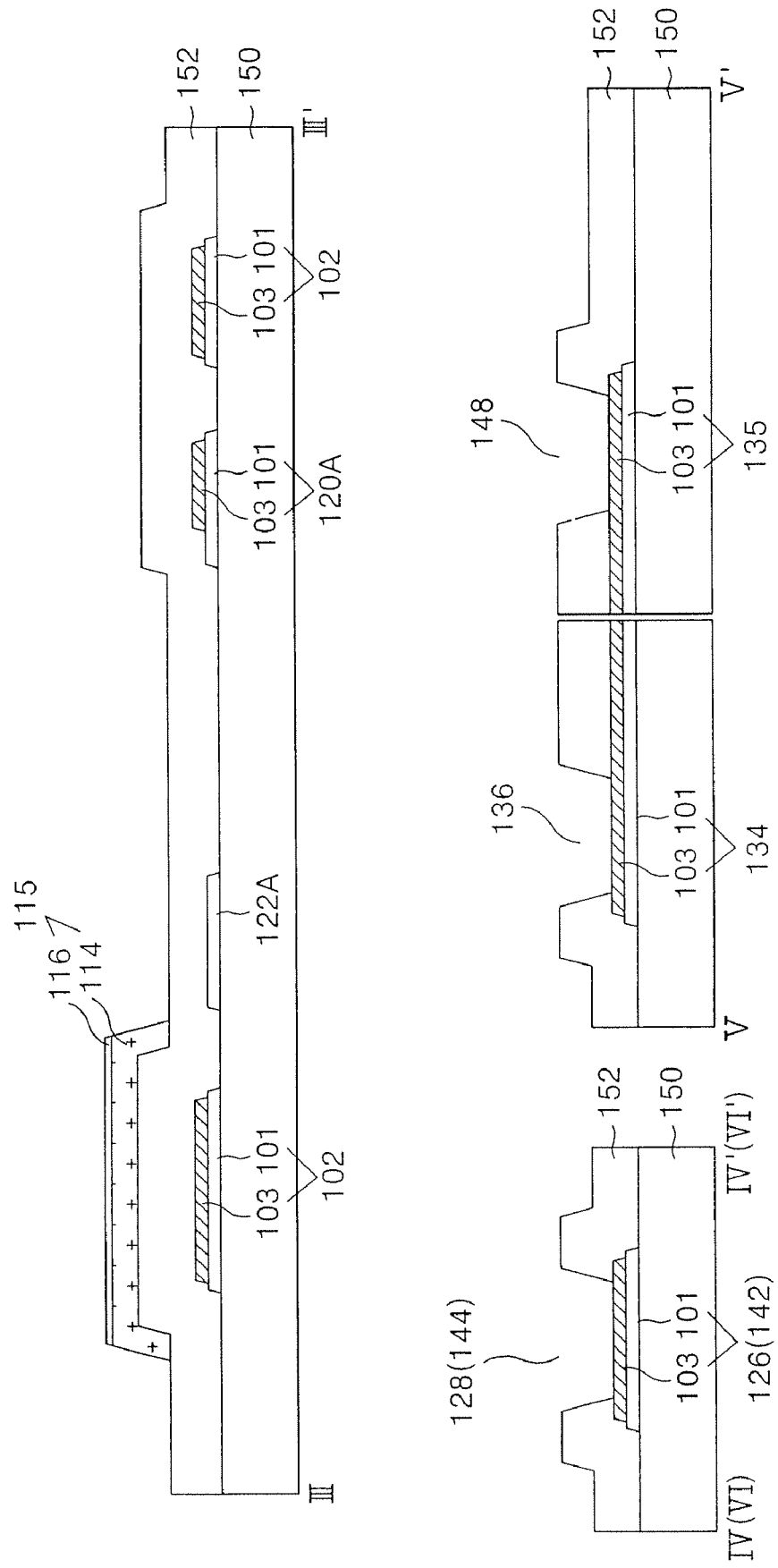

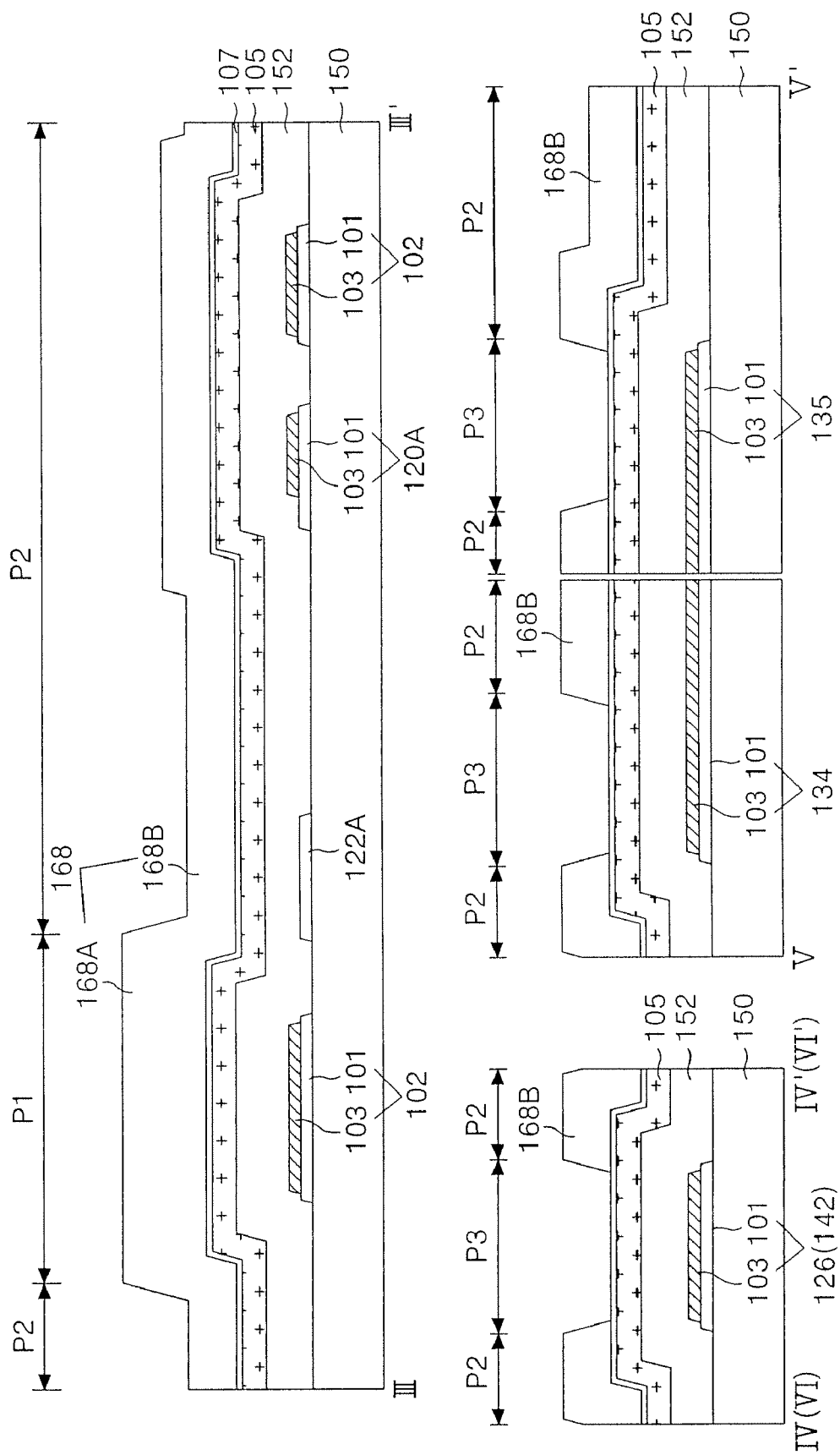

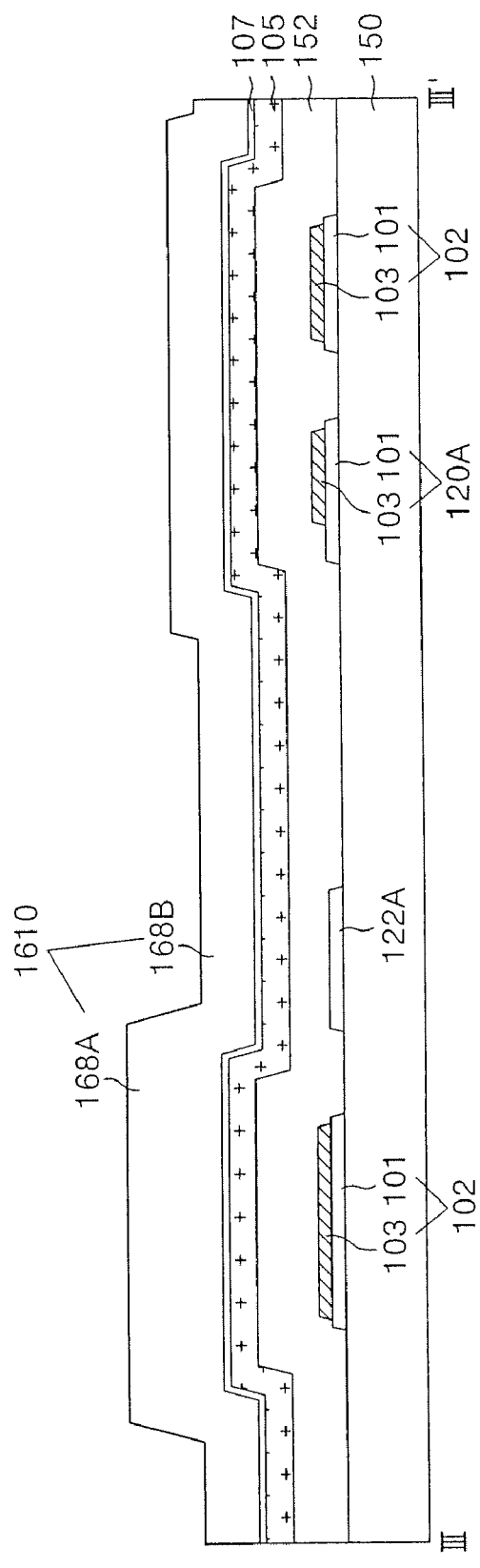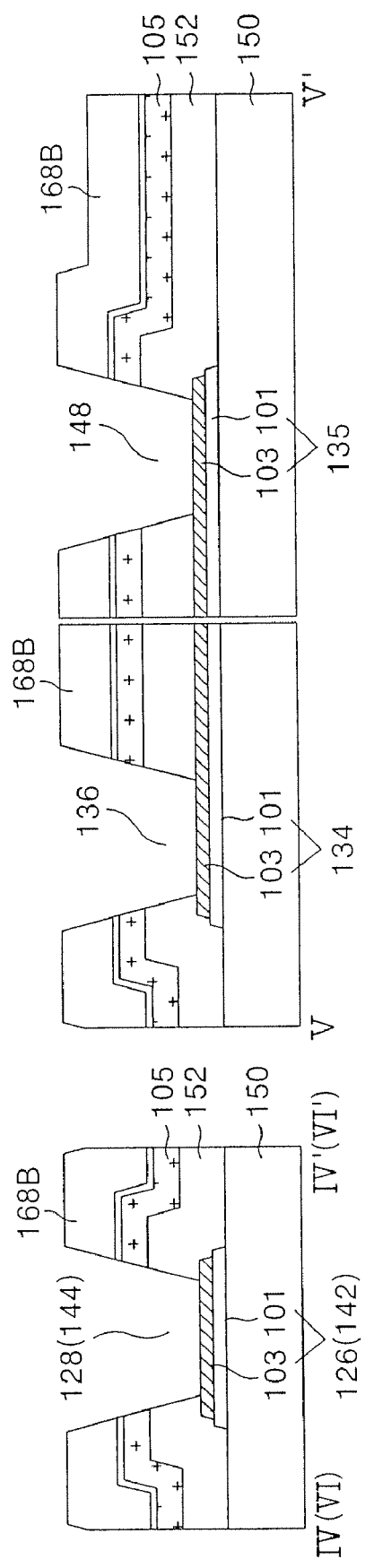
FIG.9C

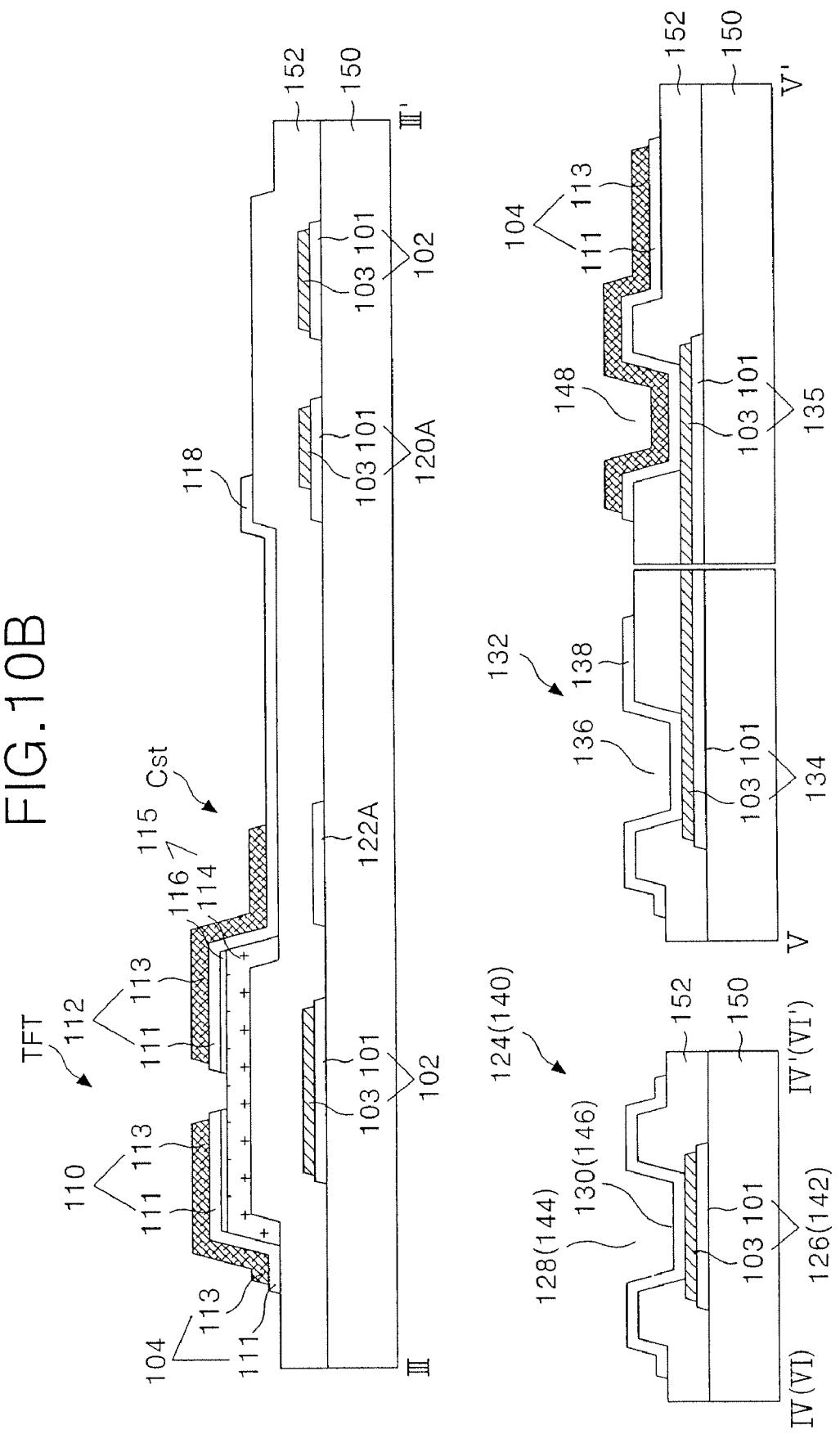

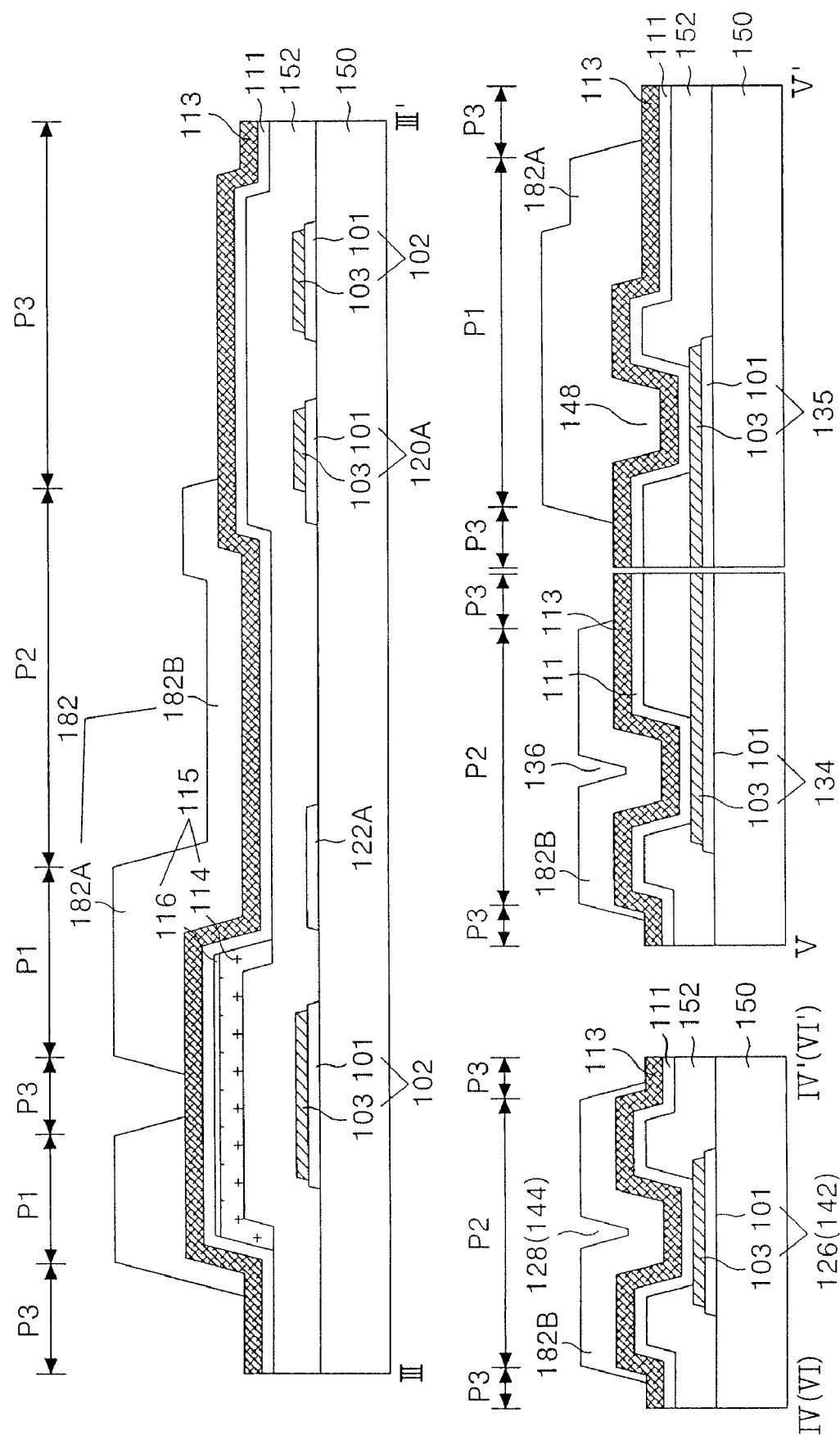

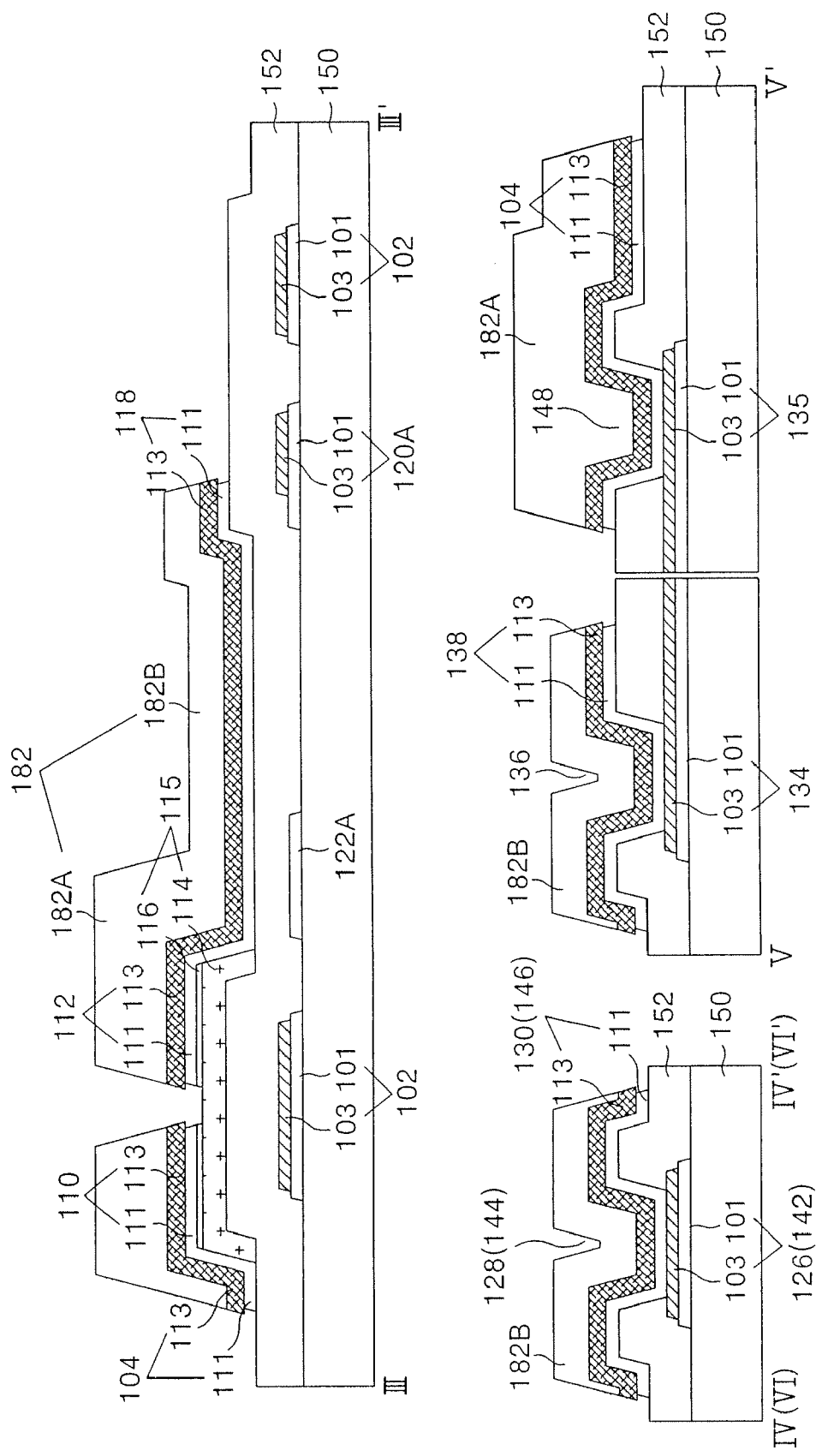

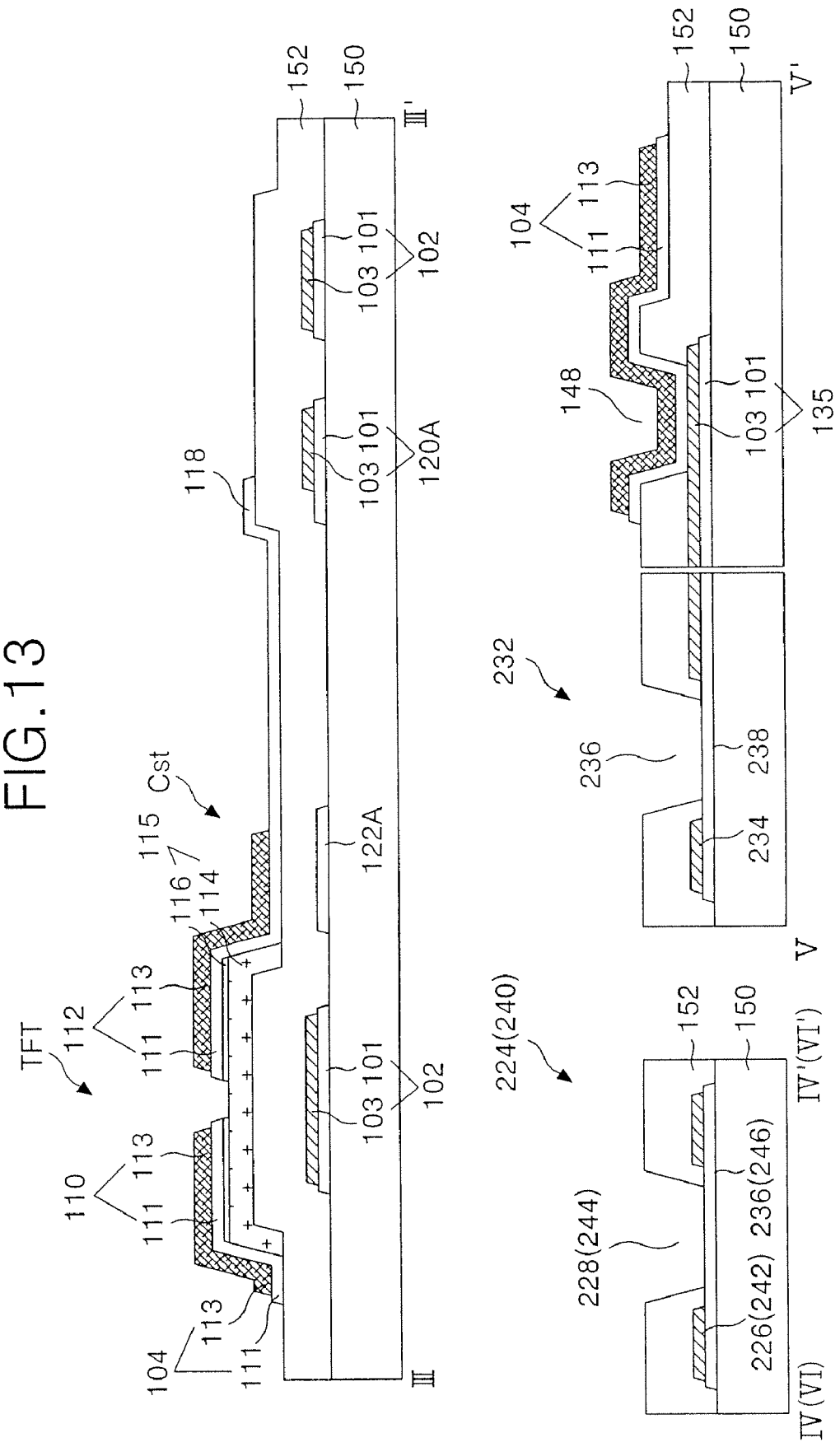

LIQUID CRYSTAL DISPLAY DEVICE AND FABRICATING METHOD THEREOF

CROSS-REFERENCE TO RELATED APPLICATIONS

This application is a Divisional of application Ser. No. 11/311,553 filed Dec. 20, 2005, now allowed, which claims priority to Korean Patent Application No. 10-2004-0112578, filed Dec. 24, 2004, all of which are hereby incorporated by reference for all purposes as if fully set forth herein.

BACKGROUND OF THE INVENTION

1. Field of the Invention

This invention relates to a liquid crystal display device using a horizontal electric field, and more particularly to a thin film transistor substrate of horizontal electric field applying type and a fabricating method thereof that are adaptive for simplifying a process.

2. Discussion of the Related Art

Generally, a liquid crystal display (LCD) controls light transmittance of a liquid crystal having a dielectric anisotropy using an electric field to thereby display a picture. To this end, the LCD includes a liquid crystal display panel for displaying a picture by a liquid crystal cell matrix, and a driving circuit for driving the liquid crystal display panel.

In FIG. 1, a related art liquid crystal display panel is comprised of a color filter substrate 10 and a thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner to be divided into red (R), green (G) and blue (B) areas, thereby transmitting red, green and blue lights. The common electrode 8 is formed of a transparent conductive layer coated entirely on the color filter 6, and supplies a common voltage Vcom that serves as a reference voltage upon driving of the liquid crystal 24. Further, an overcoat layer (not shown) for smoothing the color filter 6 may be provided between the color filter 6 and the common electrode 8.

The thin film transistor substrate 20 includes a thin film transistor 18 and a pixel electrode 22 provided for each cell area defined by a crossing between a gate line 14 and a data line 16 at a lower glass substrate 12. The thin film transistor 18 applies a data signal from the data line 16 to the pixel electrode 22 in response to a gate signal from the gate line 14. The pixel electrode 22 formed from a transparent conductive layer supplies a data signal from the thin film transistor 18 to drive the liquid crystal 24.

The liquid crystal 24 having a dielectric anisotropy is rotated in accordance with an electric field formed by a data signal from a pixel electrode 22 and a common voltage Vcom from the common electrode 8 to control light transmittance, thereby implementing a gray scale level.

Further, a liquid crystal display panel includes a spacer (not shown) for constantly keeping a cell gap between the color filter substrate 10 and the thin film transistor substrate 20.

In the liquid crystal display panel, the color filter substrate 10 and the thin film transistor substrate 20 are formed by a plurality of mask processes. Herein, one mask process includes many processes such as thin film deposition (coating), cleaning, photolithography, etching, photo-resist stripping and inspection processes, etc.

In particular, because the thin film transistor substrate includes the semiconductor process and requires the plurality of mask processes, it has a complicated fabricating process which is a major factor in increased manufacturing costs of the liquid crystal display panel. Therefore, the thin film transistor substrate has been developed toward a reduction in the number of mask process from a five-round mask process that is a standard mask process.

Meanwhile, the liquid crystal displays are largely classified into a vertical electric field applying type and a horizontal electric field applying type based upon a direction of the electric field driving the liquid crystal.

The liquid crystal display device of a vertical electric field applying type drives a liquid crystal in a twisted nematic (TN) mode with a vertical electric field formed between a pixel electrode and a common electrode arranged opposite to each other on the upper and lower substrates. The liquid crystal display device of a vertical electric field applying type has an advantage of a large aperture ratio; while having a drawback of a narrow viewing angle of about 90°.

The liquid crystal display device of a horizontal electric field applying type drives a liquid crystal in an in-plane switching (IPS) mode with a horizontal electric field between the pixel electrode and the common electrode arranged in parallel to each other on the lower substrate. The liquid crystal display device of a horizontal electric field applying type has an advantage of a wide viewing angle of about 160°.

The thin film transistor substrate in the liquid crystal display device of horizontal electric field applying type also requires a plurality of mask processes which leads to a drawback of a complicated fabricating process. Therefore, in order to reduce the manufacturing cost, it is necessary to reduce the number of mask processes.

SUMMARY OF THE INVENTION

Accordingly, the present invention is directed to a thin film transistor substrate of horizontal electric field applying type and a fabricating method thereof that substantially obviates one or more of the problems due to limitations and disadvantages of the related art.

An advantage of the present invention is to provide a thin film transistor substrate of horizontal electric field applying type and fabricating method thereof that are adaptive for simplifying a process.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprising a gate line on a substrate; a data line crossing the gate line with a gate insulating film therebetween, wherein the data and gate lines define a pixel area; a thin film transistor including a gate electrode connected to the gate line, a source electrode connected to the data line, a drain electrode opposed to the source electrode and a semiconductor pattern defining a channel between the source electrode and the drain electrode; a common line on the substrate and substantially parallel to the gate line; a common electrode extended from the common line into the pixel area; and a pixel electrode extended from the drain electrode into the pixel area to form a horizontal electric field with the common electrode, wherein the gate line and the common line have a first conductive layer group having at least double conductive layers, and the common electrode is formed by an extension of at least one transparent conductive layer of the common line; and the gate line, the source electrode and the drain electrode have a second conductive layer group having at least double conductive layers are built, and the pixel electrode is formed by an extension of at least one transparent conductive layer of the drain electrode.

In another aspect of the invention, a method of fabricating a liquid crystal display device comprises a first mask process of forming a first mask pattern group including a gate line, a gate electrode connected to the gate line and a common line substantially parallel to the gate line having a first conductive layer group structure including at least double conductive layers, and a common electrode extended from at least one of the conductive layers of the common line on a substrate; a second mask process of forming a gate insulating film for covering the first mask pattern group and a semiconductor pattern thereon; and a third mask process of forming a third mask pattern group including a data line, a source electrode connected to the data line and a drain electrode opposite the source electrode having a second conductive layer group structure including at least double conductive layers, and a pixel electrode extended from at least one of the conductive layers of the drain electrode on the gate insulating film with the semiconductor pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6a and FIG. 6b are a plan view and a section view explaining a first mask process in a method of fabricating the thin film transistor substrate of a horizontal electric field applying type according to an embodiment of the present invention, respectively;

FIG. 7a to FIG. 7e are section views explaining the first mask process of the present invention;

FIG. 8a and FIG. 8b are a plan view and a section view explaining a second mask process in a method of fabricating the thin film transistor substrate of a horizontal electric field applying type according to an embodiment of the present invention, respectively;

FIG. 9a to FIG. 9f are section views explaining the second mask process;

FIG. 10a and FIG. 10b are a plan view and a section view explaining a third mask process in a method of fabricating the thin film transistor substrate of horizontal electric field applying type according to an embodiment of the present invention, respectively;

FIG. 11a to FIG. 11e are section views explaining the third mask process;

FIG. 13 is a section view of the thin film transistor substrate taken along the III-III', IV-IV', V-V', and VI-VI' lines in FIG. 12.

DETAILED DESCRIPTION OF THE ILLUSTRATED EMBODIMENTS

Reference will now be made in detail to embodiments of the present invention, examples of which are illustrated in the accompanying drawings.

Figure 1:
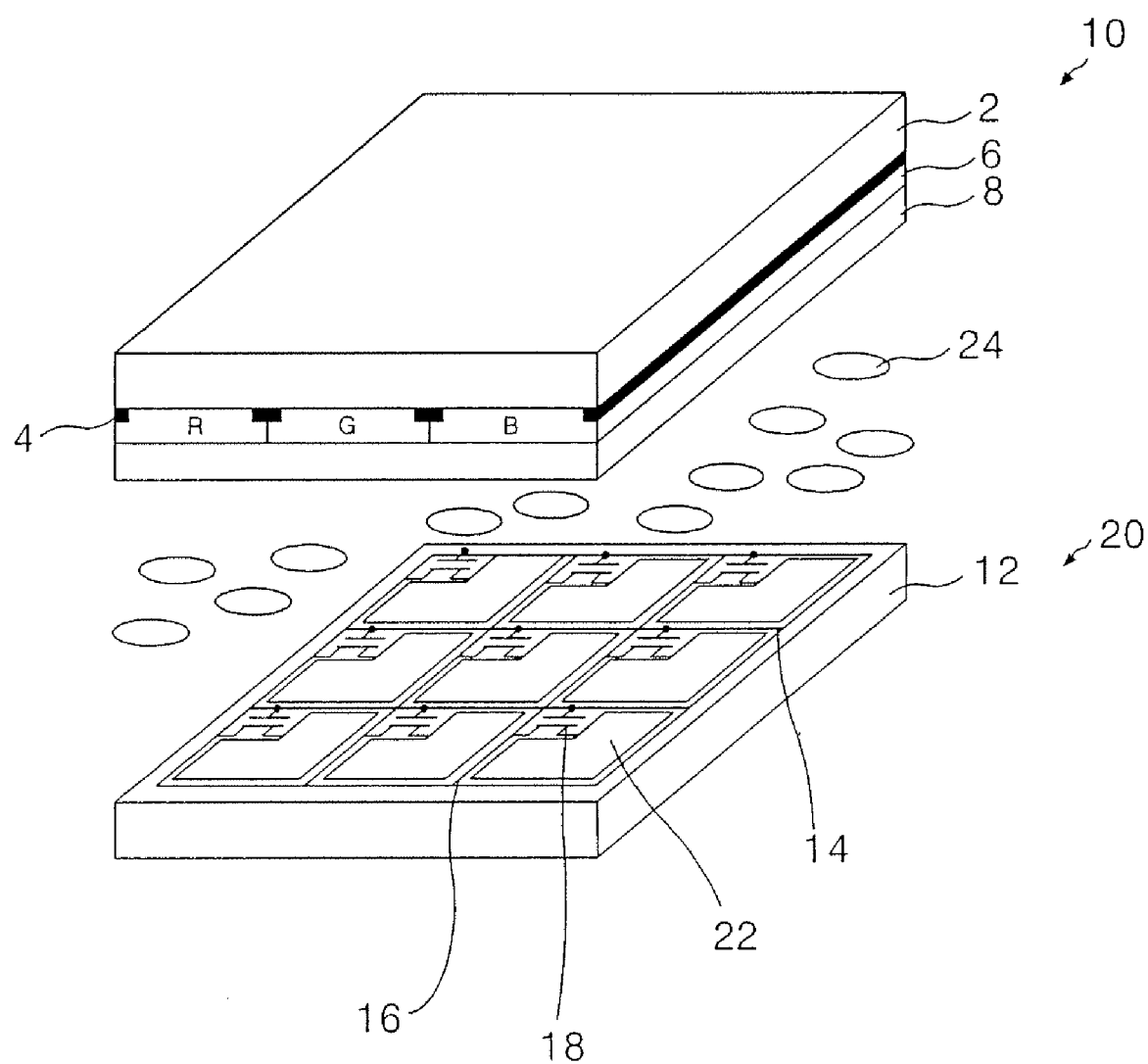
FIG. 1 is a schematic perspective view showing a structure of a related art liquid crystal display panel.
Figure 2:
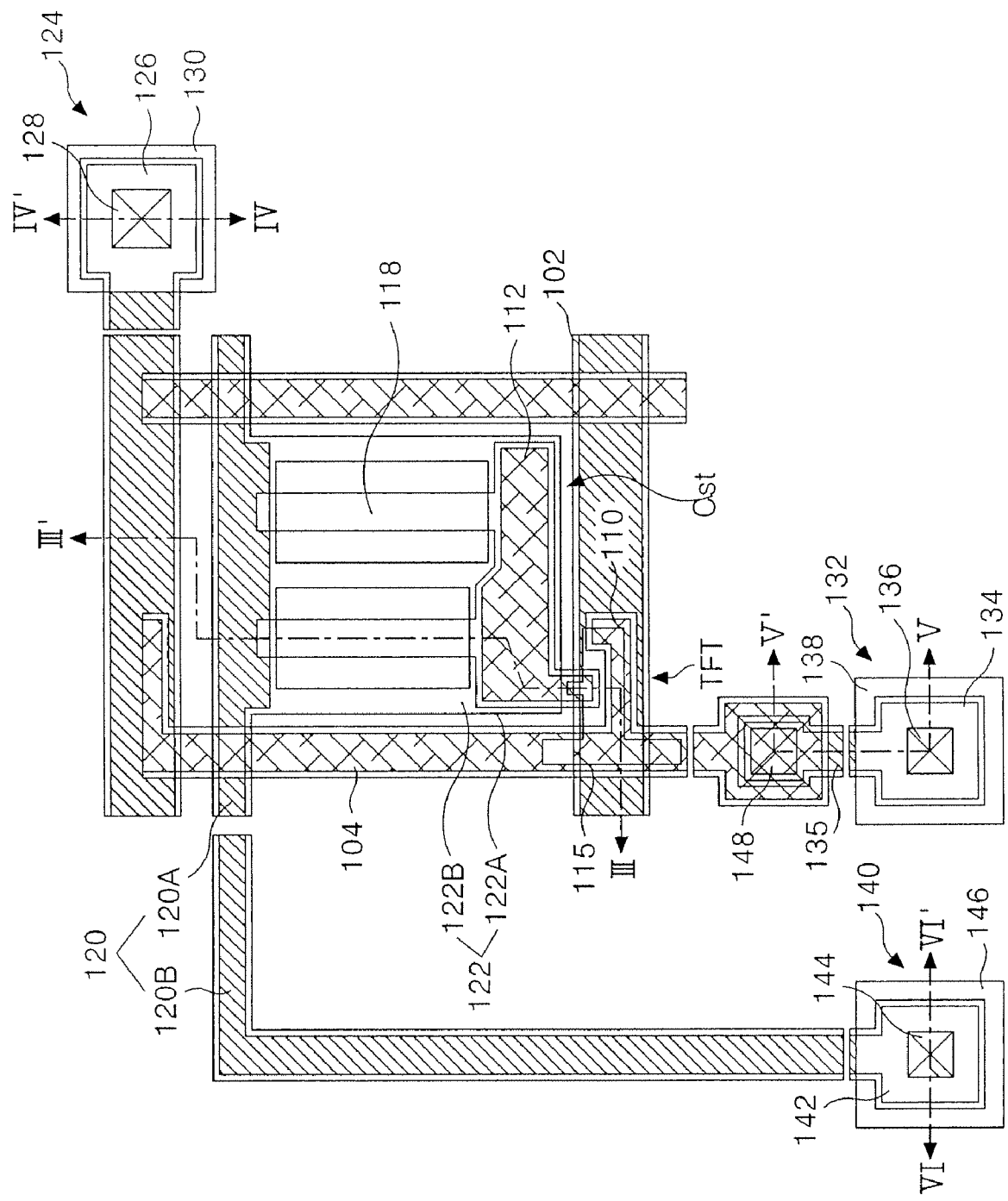
FIG. 2 is a plan view showing a portion of a thin film transistor substrate of horizontal electric field applying type according to an embodiment of the present invention.
Figure 3:
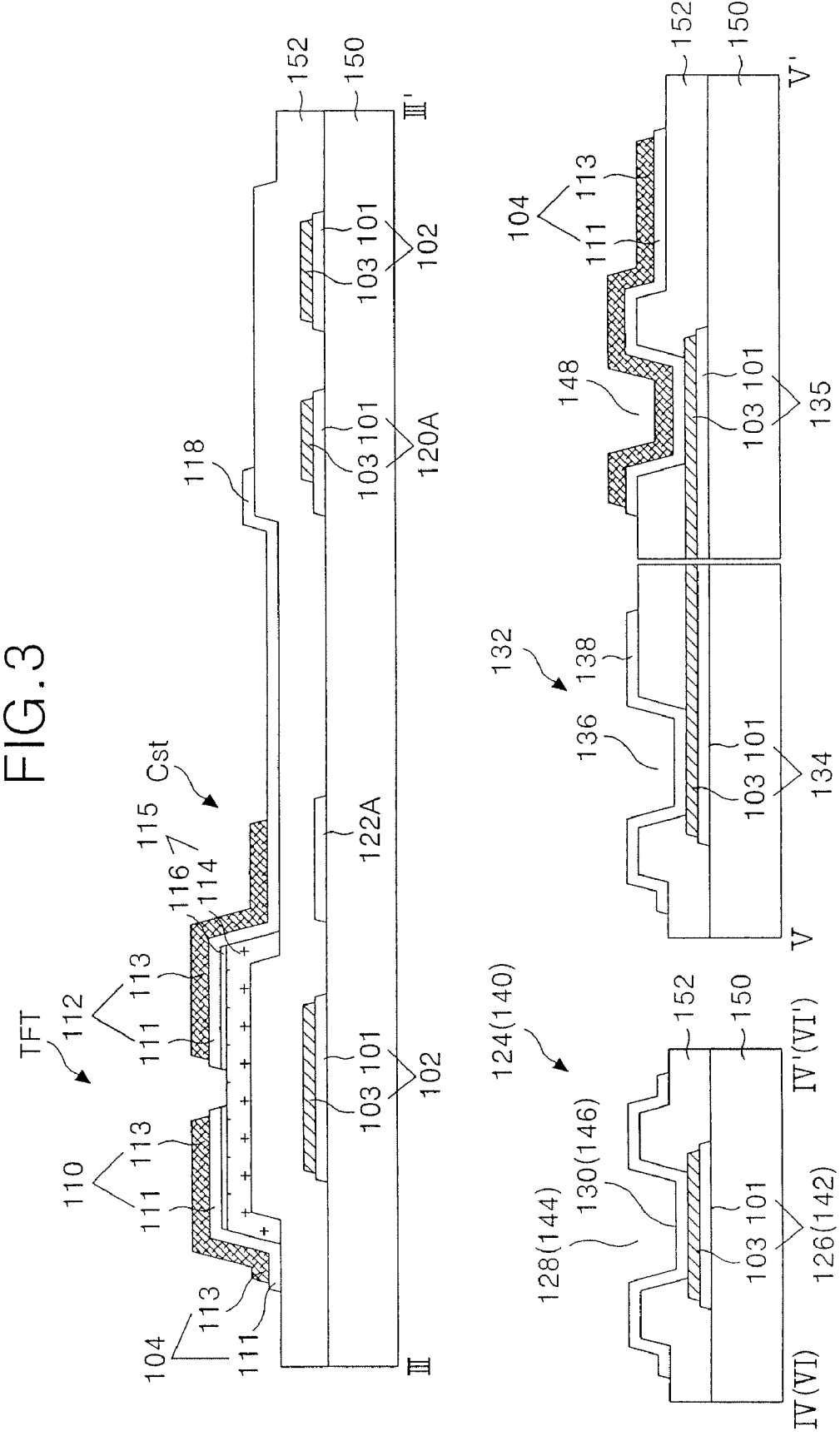
FIG. 3 are section views of the thin film transistor substrate of horizontal electric field applying type taken along the III-III', IV-IV', V-V', VI-VI' lines in FIG. 2.

FIG. 2 is a plan view illustrating a structure of a thin film transistor substrate of a horizontal electric field applying type according to an embodiment of the present invention, and FIG. 3 are section views of the thin film transistor substrate taken along the III-III', IV-IV', V-V', and VI-VI' lines in FIG. 2.

In FIG. 2 and FIG. 3, the thin film transistor substrate of a horizontal electric field applying type includes a gate line 102 and a data line 104 provided on a lower substrate 150 in such a manner to cross each other with a gate insulating film 152 therebetween and defining a pixel area, a thin film transistor TFT connected to the gate line 102, the data line 104, and a pixel electrode 118. The pixel electrode 118 and a common electrode 122 form a horizontal electric field at said pixel area. A common line 120 is connected to the common electrode 122, and a storage capacitor Cst is provided at an overlapping portion between the common electrode 122 and a drain electrode 112. Further, the thin film transistor substrate includes a gate pad 124 connected to the gate line 102, and a data pad 132 connected to the data line 104, and a common pad 140 connected to the common line 120.

The gate line 102 supplies a scanning signal from a gate driver (not shown); while the data line 104 supplies a video signal from a data driver (not shown). The gate line 102 and the data line 104 cross each other with the gate insulating film 152 therebetween to define the pixel area.

The gate line 102 is formed on the substrate 150 in a multiple-layer structure having at least double gate metal layers. For example, as shown FIG. 3, the gate line 102 has a double-layer structure in which a first conductive layer 101 employing a transparent conductive layer and a second conductive layer 103 formed of an opaque metal are built. The data line 104 is formed on the gate insulating film 152 in a multiple-layer structure having at least double gate metal layers. For example, as shown FIG. 3, the data line 104 has a double-layer structure in which a third conductive layer 111 employing a transparent conductive layer and a fourth conductive layer 113 formed of an opaque metal are formed. The first and third conductive layer 101 and 111 are formed of, for example, ITO, TO, IZO or ITZO, etc. The second and fourth conductive layer 103 and 113 are formed of, for example, Cu, Mo, Al, a Cu-alloy, a Mo-alloy and an Al-alloy, etc.

The thin film transistor TFT allows a video signal applied to the data line 104 to charge the pixel electrode 118 and maintain a response to a scanning signal applied to the gate line 102. To this end, the thin film transistor includes a gate electrode extended from the gate line 102, a source electrode 110 connected to the data line 104, a drain electrode 112 positioned opposite the source electrode 110 and connected to the pixel electrode 118, an active layer 114 overlapping the gate line 102 and having the gate insulating film 152 therebetween to provide a channel between the source electrode 110 and the drain electrode 112, and an ohmic contact layer 116 formed on the active layer 114 other than the channel portion to provide an ohmic contact with the source electrode 110 and the drain electrode 112. Herein, the source electrode 110 and the drain electrode 112 have a double-layer structure in which the third and fourth conductive layers 111 and 113 are formed on the gate insulting film 152 and the semiconductor pattern 115 along with the data line 104.

The common line 120 and the common electrode 122 supply a reference voltage for driving the liquid crystal, that is, a common voltage to each pixel.

To this end, the common line 120 includes an internal common line 120A provided in parallel to the gate line 102 at a display area, and an external common line 120B commonly connected to the internal common line 120A at an non-display area. The common line 120 has a double-layer structure in which the first conductive layer and second conductive layers 101 and 103 are formed on the substrate 150 along with the above-mentioned gate line 102.

The common electrode 122 is provided within the pixel area and connected to the internal common line 120A. More specifically, the common electrode 122 includes a horizontal part 122A overlapping the drain electrode 112 adjacent to the gate line 102, and a finger part 122B extended from the horizontal part 122A into the pixel area and connected to the internal common line 120A. The common electrode 122 is formed of the first conductive layer of the common line 120, that is, a transparent conductive layer.

The storage capacitor Cst is provided such that the first horizontal part 122A of the common electrode 122 overlaps with the drain electrode 112 with the gate insulating film 152 therebetween. Herein, the drain electrode 112 is extended from the overlapping portion between it and the thin film transistor TFT, that is, the gate line 102 in such a manner to overlap with the horizontal part 122A of the common electrode 122 as widely as possible. Thus, a capacitance value of the storage capacitor Cst is increased by the wide overlapping area between the common electrode 122A and the drain electrode 112, so that the storage capacitor Cst allows a video signal charged in the pixel electrode 118 to be stably maintained until the next signal is charged.

The pixel electrode 118 is extended from the drain electrode 112 in such a manner to have a finger shape substantially parallel to the finger part 122B of the common electrode 122. The edge of the pixel electrode 118 is overlapped with the internal common line 102A. Particularly, the pixel electrode 118 is formed of the third conductive layer 111 extended from the drain electrode 112, that is, a transparent conductive layer. If a video signal is applied, via the thin film transistor, to the pixel electrode 118, then a horizontal electric field is formed between the pixel electrode 118 and the finger part 122B of the common electrode 122 supplied with the common voltage. Liquid crystal molecules arranged in the horizontal direction between the thin film transistor array substrate and the color filter array substrate by such a horizontal electric field are rotated due to a dielectric anisotropy. Transmittance of a light transmitting the pixel area is differentiated depending upon a rotation extent of the liquid crystal molecules, thereby implementing a gray level scale.

Herein, when the common electrode 122 and the pixel electrode 18 form a horizontal electric field, the finger part 122B of the common electrode 122 and each side (an area positioned inwardly about 1 μm from the edge) of the pixel electrode 118 contribute to an aperture ratio, thereby improving an aperture ratio.

Figure 4:
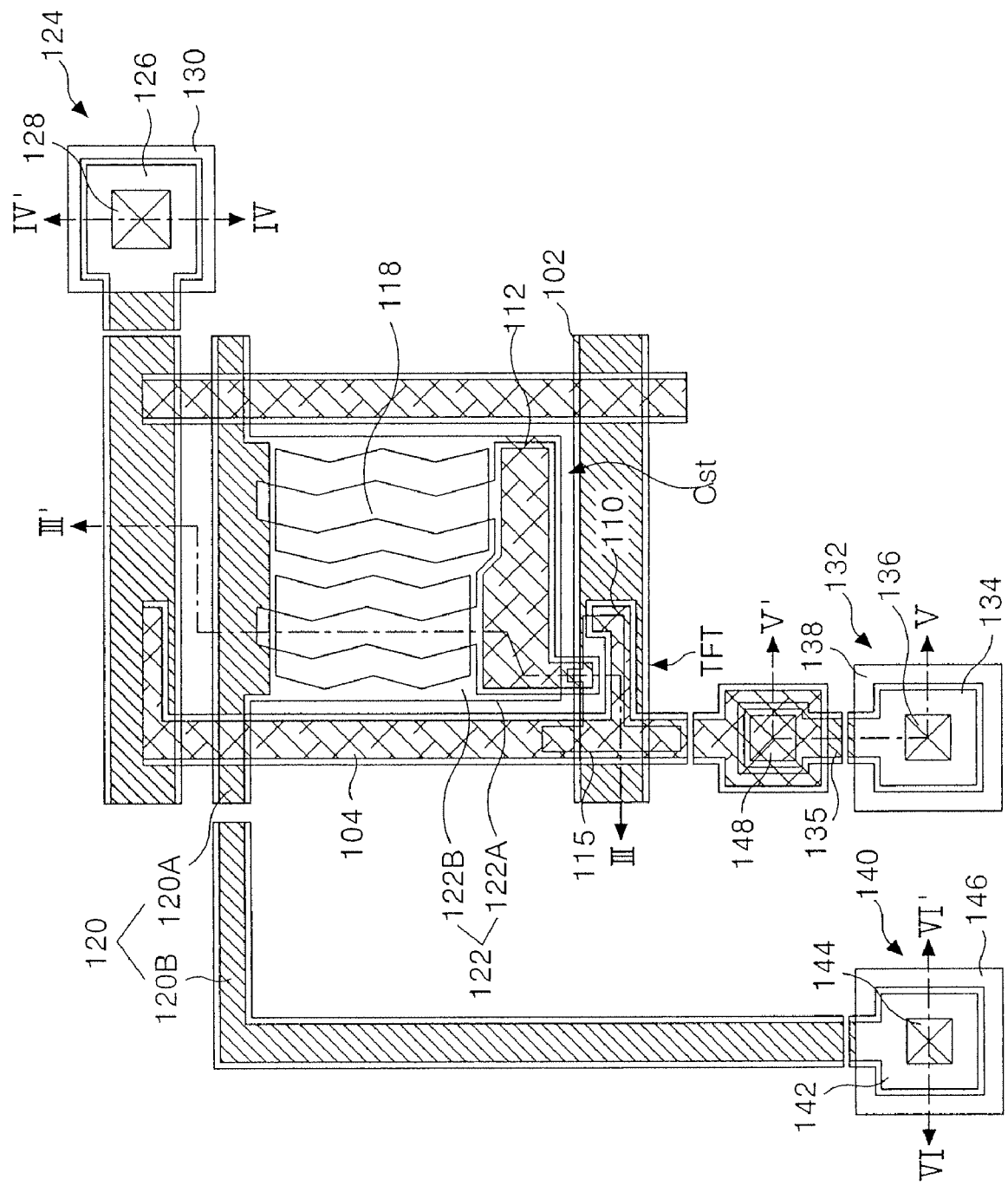
FIG. 4 is a plan view showing a portion of a thin film transistor substrate of horizontal electric field applying type according to another embodiment of the present invention.

Further, as shown FIG. 4, the finger part 122B of the common electrode 122 and the finger part 118B of the pixel electrode 118 may be formed in a zigzag shape. The edge adjacent to the data line 104 in the finger part 122B of the common electrode 122 is formed in such a manner to be substantially parallel to the data line 104 or in a zigzag shape. Also, the data line 104 may be formed in a zigzag shape along the finger part 122B of the adjacent common electrode 122.

The gate line 102 is connected, the gate pad 124, to the gate driver (not shown). The gate pad 124 consists of a lower gate pad electrode 126 extended from the gate line 102, and an upper gate pad electrode 130 connected, via a first contact hole 128 passing through the gate insulating film 152, to the lower gate pad electrode 126.

The data line 104 is connected, via the data pad 132, to a data driver (not shown). The data pad 132 consists of a lower data pad electrode 134 connected to a data link 135, an upper data pad electrode 138 connected, via a second contact hole 136 passing through the gate insulating film 152, to the lower data pad electrode 134.

The common line 120 receives a reference voltage from a common voltage source (not shown) via the common pad 140. The common pad 140 consists of a lower common pad electrode 142 extended from the external common line 120b, and an upper common pad electrode 146 connected, via a third contact hole 144 passing through the gate insulating film 152, to the lower common pad electrode 142.

In such a thin film transistor substrate according to the embodiment of the present invention, the data pad 132 has the same structure as the gate pad 124 and the common pad 140. More specifically, the lower gate pad electrode 126, the lower common pad electrode 142, the lower data pad electrode 134 and the data link 135 have a double-layer structure in which the first conductive layer and second conductive layers 101 and 103 are built on the substrate 150 along with the above-mentioned gate line 102. Also, the upper gate pad electrode 130, the upper common pad electrode 146 and the upper data pad electrode 138 are formed on the gate insulating film 152 along with the data line 104, and are formed from the third conductive layer 111 in which the fourth conductive layer 113 is removed, that is, a transparent conductive layer.

Accordingly, the data link 135 formed on the substrate 150 is connected, via a fourth contact hole 148 passing through the gate insulating film 152, to the data line 104. The data link 135 is extended from the lower data pad electrode 134 to thereby have a structure in which the first and second conductive layers 101 and 103 are built. The second conductive layer 103 of the data link 135 is exposed through the fourth contact hole 148 to be connected to the third conductive layer 111 of the data line 104. In this case, the third conductive layer 111 of the data line 104 is integral to the upper data pad electrode 138. The data line 104 is exposed due to an absence of the protective film. In order to prevent the fourth conductive layer 113 of the data line 104 from being exposed to the exterior thereof and oxidized, as shown FIG. 5, the fourth contact hole 148 is positioned within an area sealed by a sealant 200. Thus, the fourth conductive layer 113 of the data line 104 positioned at the sealed area is protected by a lower alignment film 214 to be formed thereon.

Figure 5:
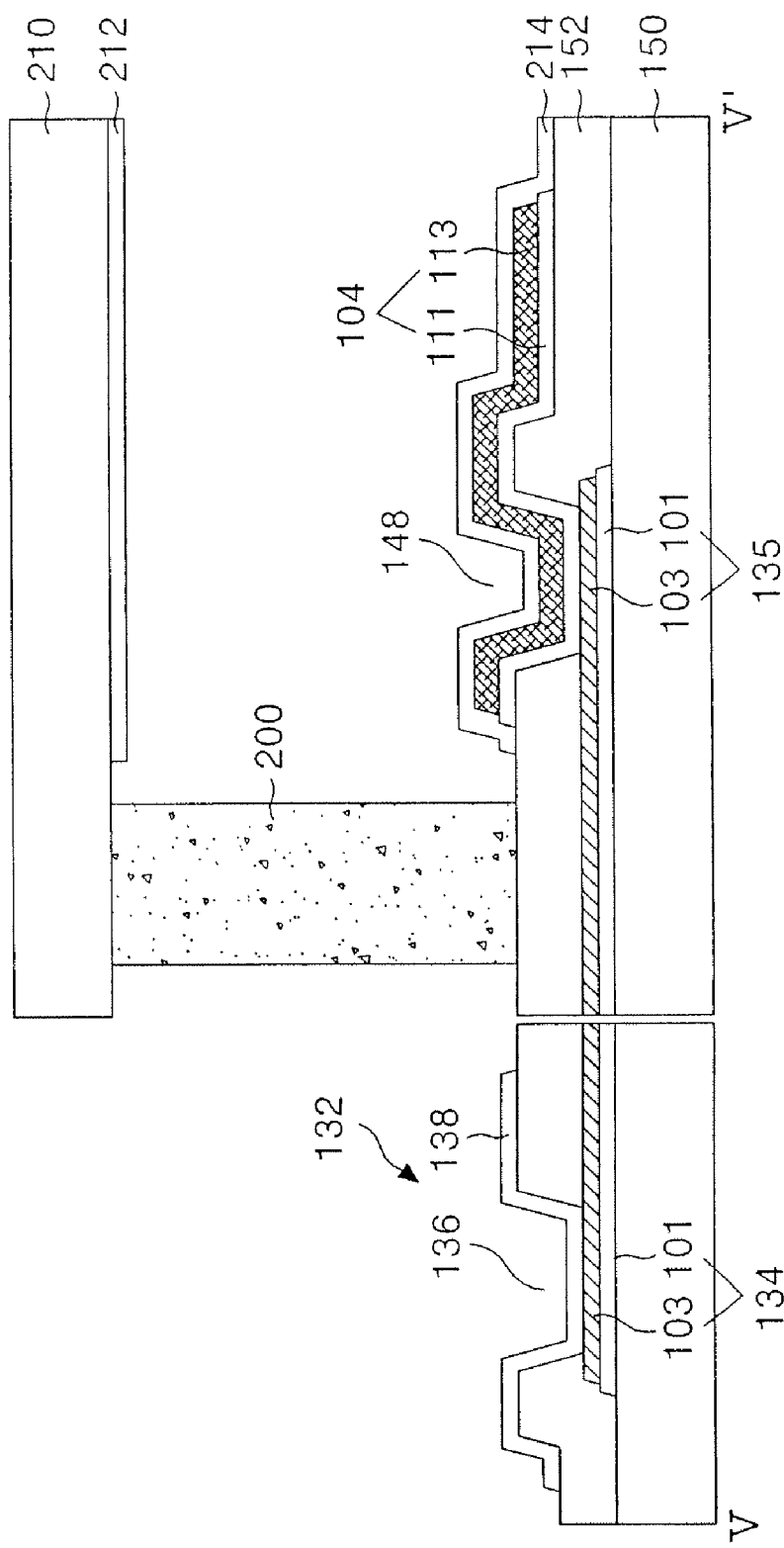
FIG. 5 is a section view showing a data pad area of a liquid crystal display panel employing the thin film transistor substrate of a horizontal electric field applying type shown in FIG. 3.

Referring to FIG. 5, a thin film transistor substrate formed with the lower alignment film 214 and a color filter substrate 210 coated with an upper alignment film 212 are joined to each other by the sealant 200, and a cell gap between the two substrates sealed by the sealant 200 is filled with a liquid crystal. In this case, the liquid crystal may be formed by a liquid crystal dropping method in which a liquid crystal layer is formed by dropping the liquid crystal onto at least one substrate and then joining them, or a vacuum injection method in which two substrates are joined and then the liquid crystal is injected. The upper and lower alignment films 212 and 214 are formed with an organic insulating material at each picture display area of the two substrates. The sealant 200 is formed with being spaced in such a manner to be not in contact with the upper and lower alignment films 212 and 214 for the purpose of reinforcing an adhesive force. Thus, the data line 104, the source electrode 110, the drain electrode 112, and the pixel electrode 118 provided on the thin film transistor substrate are positioned at an area sealed by the sealant 200, so that it may be sufficiently protected by the lower alignment film 214 formed thereon as well as by the liquid crystal filled in the sealed area.

The thin film transistor substrate of horizontal electric field applying type according to the first embodiment of the present invention having no protective film as described above is formed by the following three-round mask process.

Figure 6B:
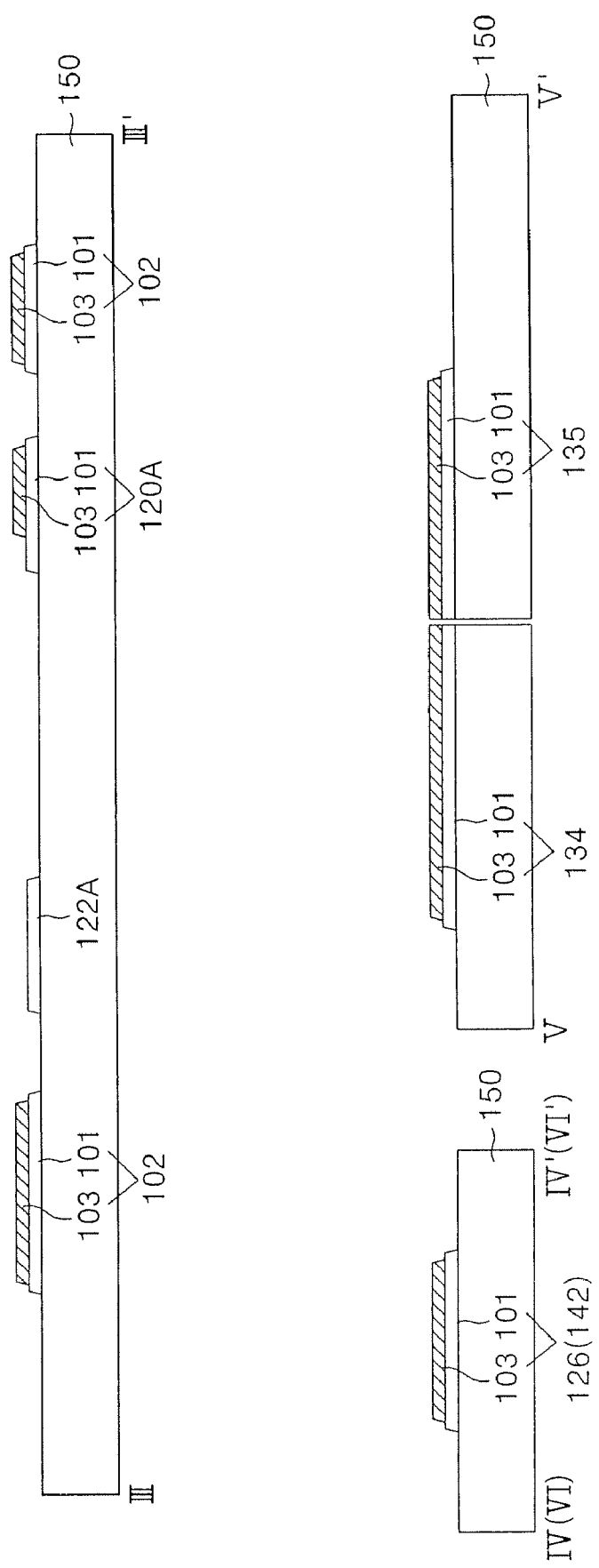

FIG. 6a and FIG. 6b are a plan view and a section view explaining a first mask process, respectively, in a method of fabricating the thin film transistor substrate of horizontal electric field applying type according to the embodiment of the present invention, and FIG. 7a to FIG. 7e are section views more specifically explaining the first mask process.

A first mask pattern group including the gate line 102, the lower gate pad electrode 126, the common line 120, the common electrode 122, the lower common pad electrode 142, the data link 135 and the lower data pad electrode 134 are formed on the lower substrate 150 by the first mask process. Herein, the first mask pattern group other than the common electrode 122 has a multiple-layer structure in which at least two conductive layers are formed. For convenience, a double-layer structure having the first and second conductive layers 101 and 103 formed will be explained. The common electrode 122 has a single-layer structure of the first conductive layer 101 that is a transparent conductive layer. The first mask pattern group having such multiple-layer structure and single-layer structure is formed by a single mask process using, for example, a diffractive exposure mask or a half tone mask, etc. Hereinafter, a case where the half tone mask is used as a first mask will be described.

In FIG. 7a, the first and second conductive layers 101 and 103 are disposed on the lower substrate 150 by a deposition technique such as sputtering, etc. The first conductive layer 101 is formed of a transparent conductive material such as ITO, TO, IZO or ITZO, etc. The second conductive layer 103 employ a single layer formed of a metal material such as Mo, Ti, Cu, AlNd, Al, Cr, a Mo alloy, a Cu alloy or an Al alloy, etc., or a layered structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc.

Referring to FIG. 7b, a first photo-resist pattern 162 having step coverage is formed by photolithography using a half tone mask. A half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The first photo-resist pattern 162 includes a different thickness of first photo-resist patterns 162A and 162B and an aperture part is formed by photolithography using a half tone mask. In this case, the relatively thick first photo-resist pattern 162A is provided at a shielding area P1 of the first photo-resist overlapping with the shielding part of the half tone mask; the first photo-resist pattern 162B is thinner than the first photo-resist pattern 162A and is provided at a half tone exposure area P2 overlapping the half tone transmitting part; and the aperture part is provided at an full exposure area P3 overlapping with the full transmitting part.

Figure 7C:
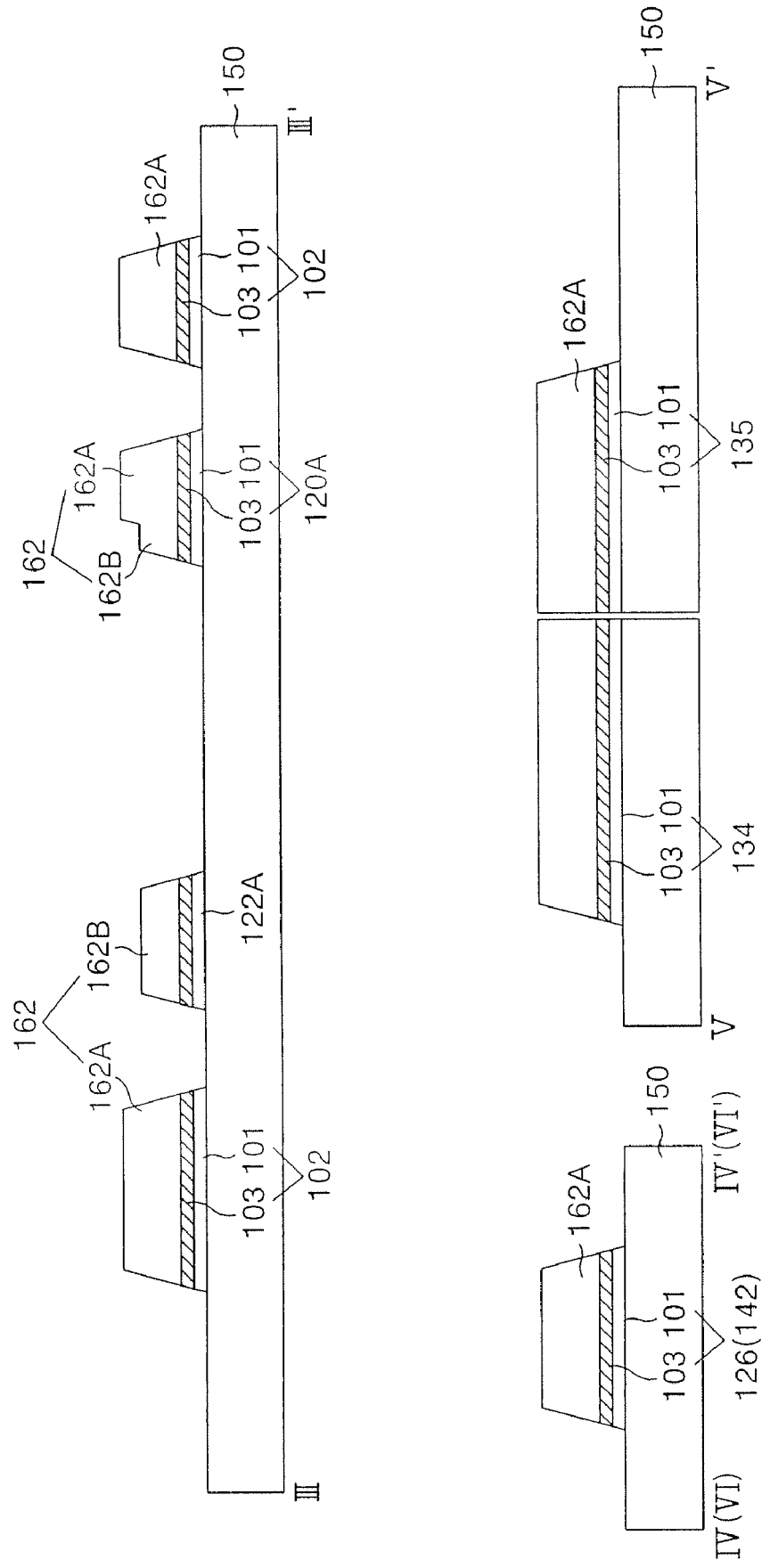

Referring to FIG. 7c, the exposed portions of the first and second conductive layers 101 and 103 are etched by an etching process using the first photo-resist pattern 162 as a mask, thereby providing the first mask pattern group including a double-layer structure of the gate line 102, the lower gate pad electrode 126, the common line 120, the common electrode 122, the lower common pad electrode 142, the data link 135 and the lower data pad electrode 134.

In FIG. 7d, a thickness of the first photo-resist pattern 162A is thinned and the first photo-resist pattern 162B is removed by an ashing process using an oxygen ($O_2$) plasma. Further, the second conductive layer 103 on the common electrode 122 is removed by an etching process using the ashed first photo-resist pattern 162A as a mask. In this case, each side of the patterned second conductive layer 103 is again etched along the ashed first photo-resist pattern 162A, thereby allowing the first and second conductive layers 101 and 103 of the first mask pattern group to have a constant step coverage in a substantially rectangular or trapezoid shape. Accordingly, when side surfaces of the first and second conductive layers 101 and 103 have a high steep inclination, it becomes possible to prevent a step coverage badness of the gate insulating film 152 that may be generated thereon.

Figure 7E:
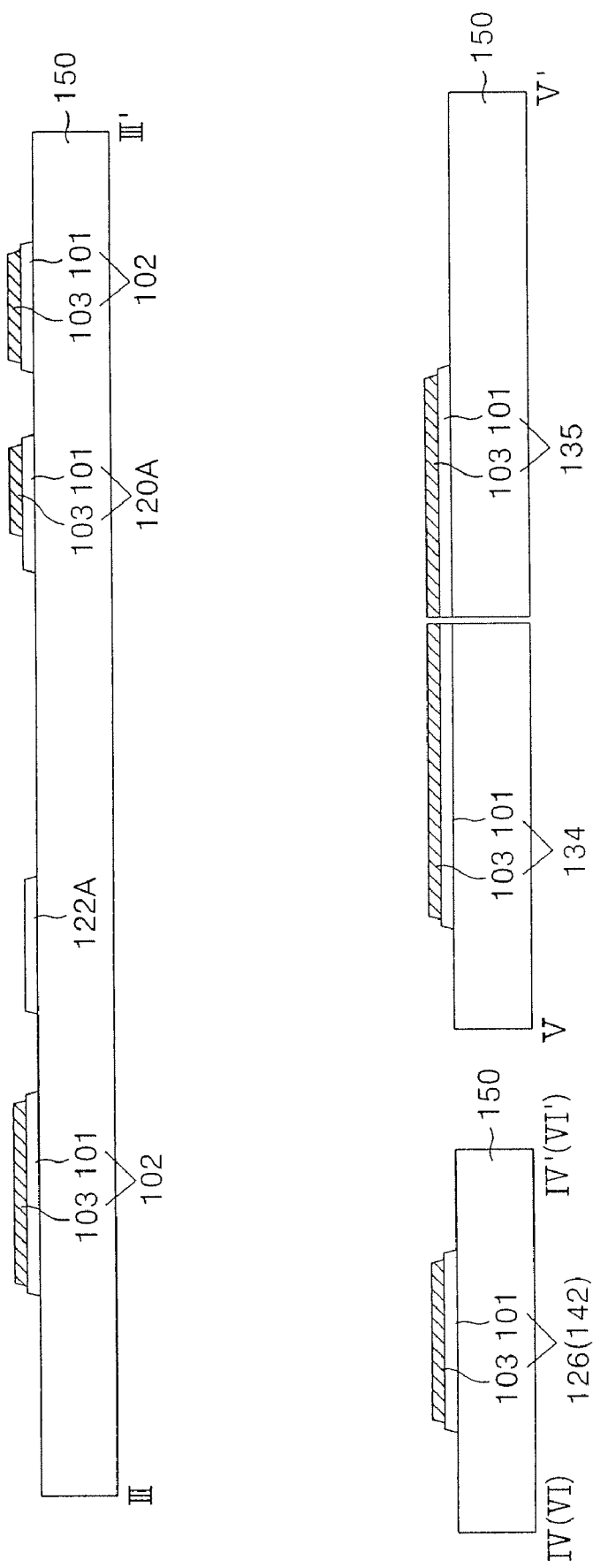

Referring to FIG. 7e, the first photo-resist pattern 162A left on the first mask pattern group in FIG. 7d is removed by the stripping process.

FIG. 8a and FIG. 8b are a plan view and a section view explaining a second mask process in a method of fabricating the thin film transistor substrate of horizontal electric field applying type according to an embodiment of the present invention, respectively, and FIG. 9a to FIG. 9f are section views more specifically explaining the second mask process.

The gate insulating film 152 including first to fourth contact holes 128, 136, 144 and 148 and the semiconductor pattern 115 are formed on the lower substrate 150 provided with the first mask pattern group by the first mask process. The semiconductor pattern 115 and the contact holes 128, 136, 144 and 148 of the gate insulating film 152 are defined by a single mask process using a diffractive exposure mask or a half tone mask. Hereinafter, a case where the half tone mask is used as a second mask will be described.

Figure 9A:
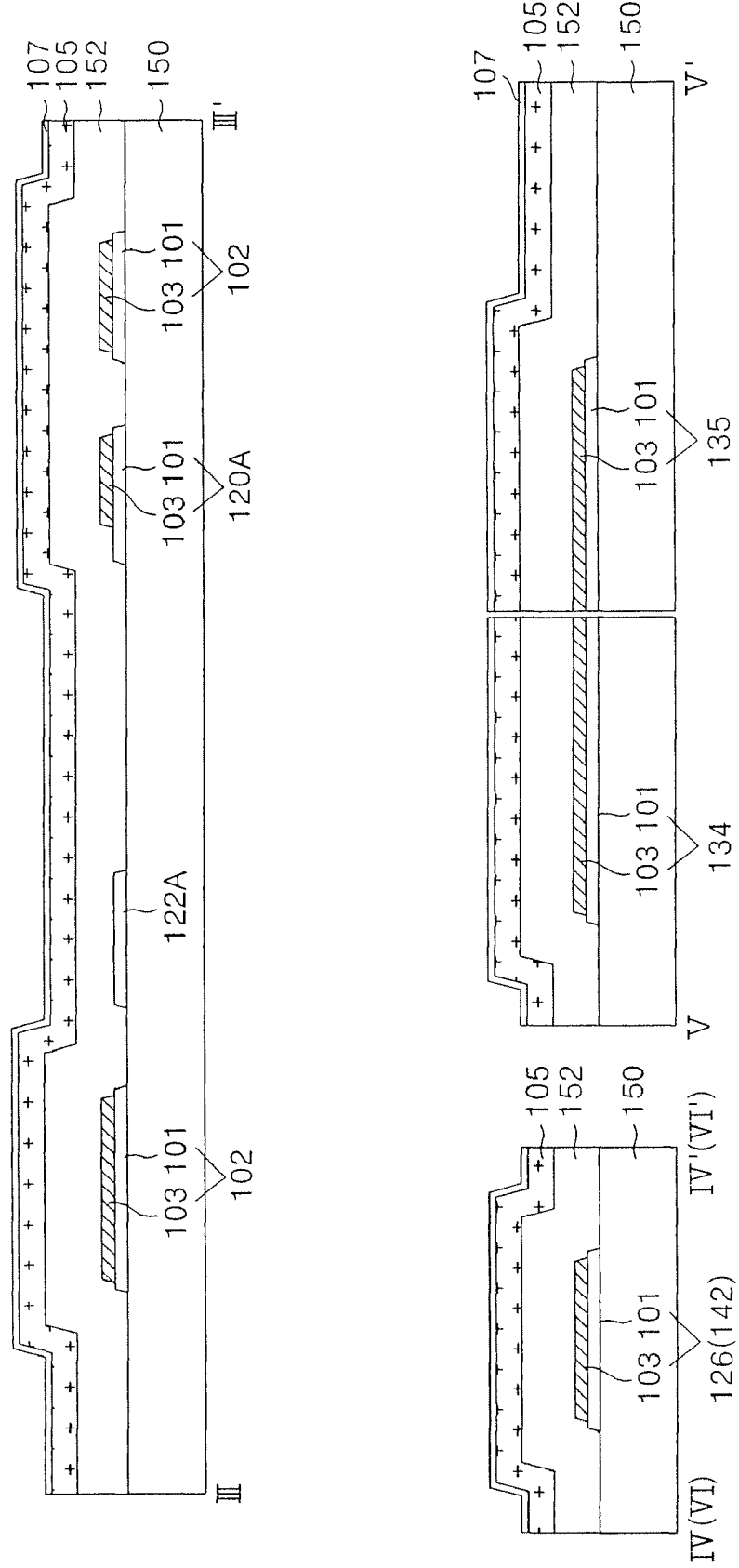

In FIG. 9a, the gate insulating film 152, an amorphous silicon layer 105 and an amorphous silicon layer 107 doped with an $n^+$ or $p^+$ impurity are sequentially disposed on the lower substrate 150 provided with the first mask pattern group by a deposition technique such as the PECVD, etc. Herein, the gate insulating film 152 is formed of an inorganic insulating material such as silicon oxide ($SiO_x$) or silicon nitride ($SiN_x$).

In FIG. 9b, a second photo-resist pattern 168 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The second photo-resist pattern 168 includes a different thickness of second photo-resist patterns 168A and 168B and an aperture part is formed by the photolithography using a half tone mask. In this case, the relatively thick second photo-resist pattern 168A is provided at a shielding area P1 of the second photo-resist overlapping with the shielding part of the half tone mask; the second photo-resist pattern 168B is thinner than the second photo-resist pattern 168A and is provided at a half tone exposure area P2 overlapping the half-tone transmitting part; and the aperture part is provided at an full exposure area P3 overlapping the full transmitting part.

In FIG. 9c, the first to fourth contact holes 128, 136, 144 and 148 passing through the gate insulating film 152 from the amorphous silicon layer 107 doped with an n$^+$ or p$^+$ impurity 107 are formed by the etching process using the second photo-resist pattern 168 as a mask. The first contact hole 128 exposes the lower gate pad electrode 126; the second contact hole 136 exposes the lower data pad electrode 134; the third contact hole 144 exposes the lower common pad electrode 142; and the fourth contact hole 148 exposes the data link 135.

Figure 9D:
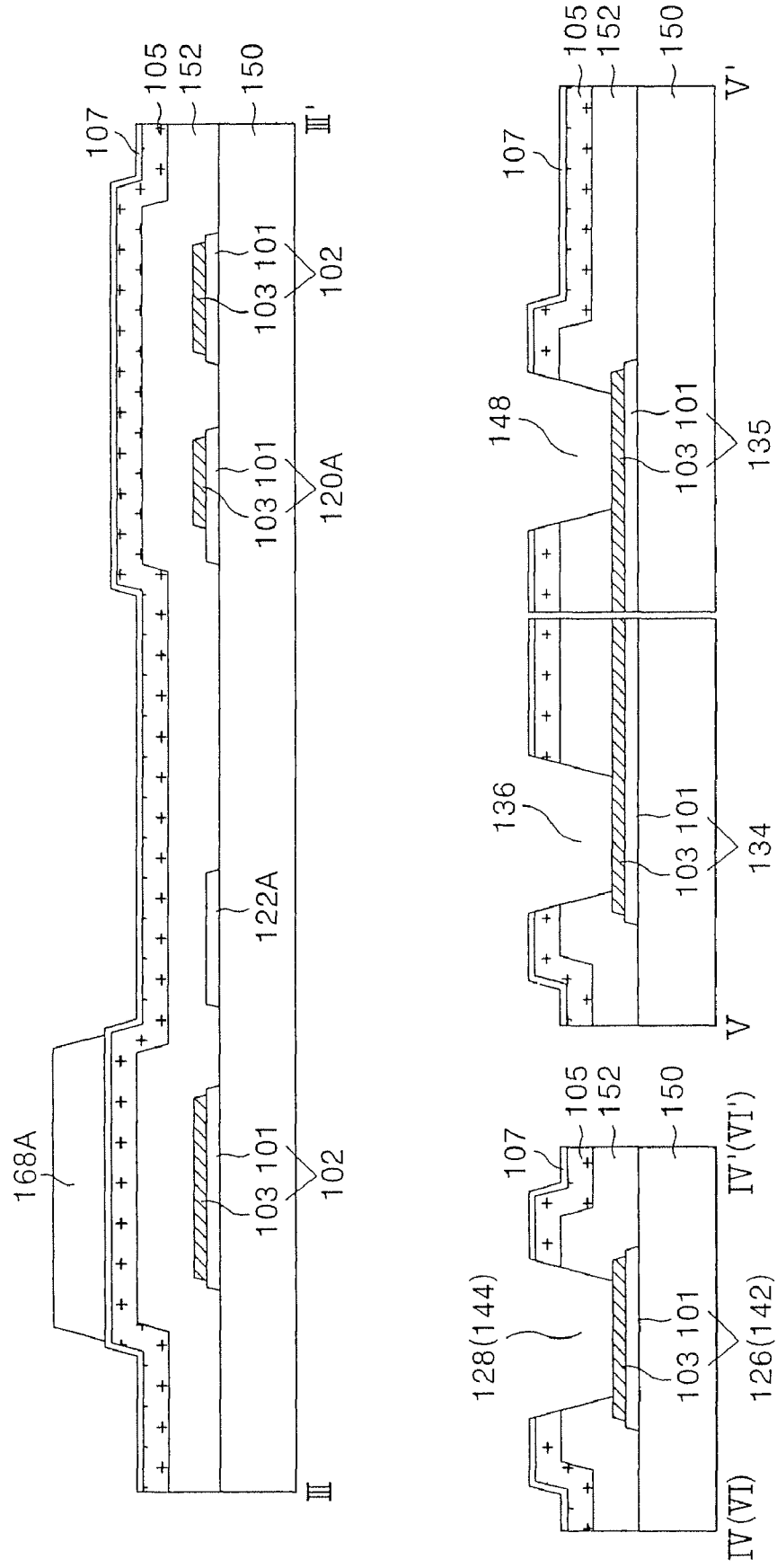

Referring to FIG. 9d, a thickness of the second photo-resist pattern 168A is thinned while the second photo-resist pattern 168B is removed by an ashing process using an oxygen ($O_2$) plasma.

Figure 9E:
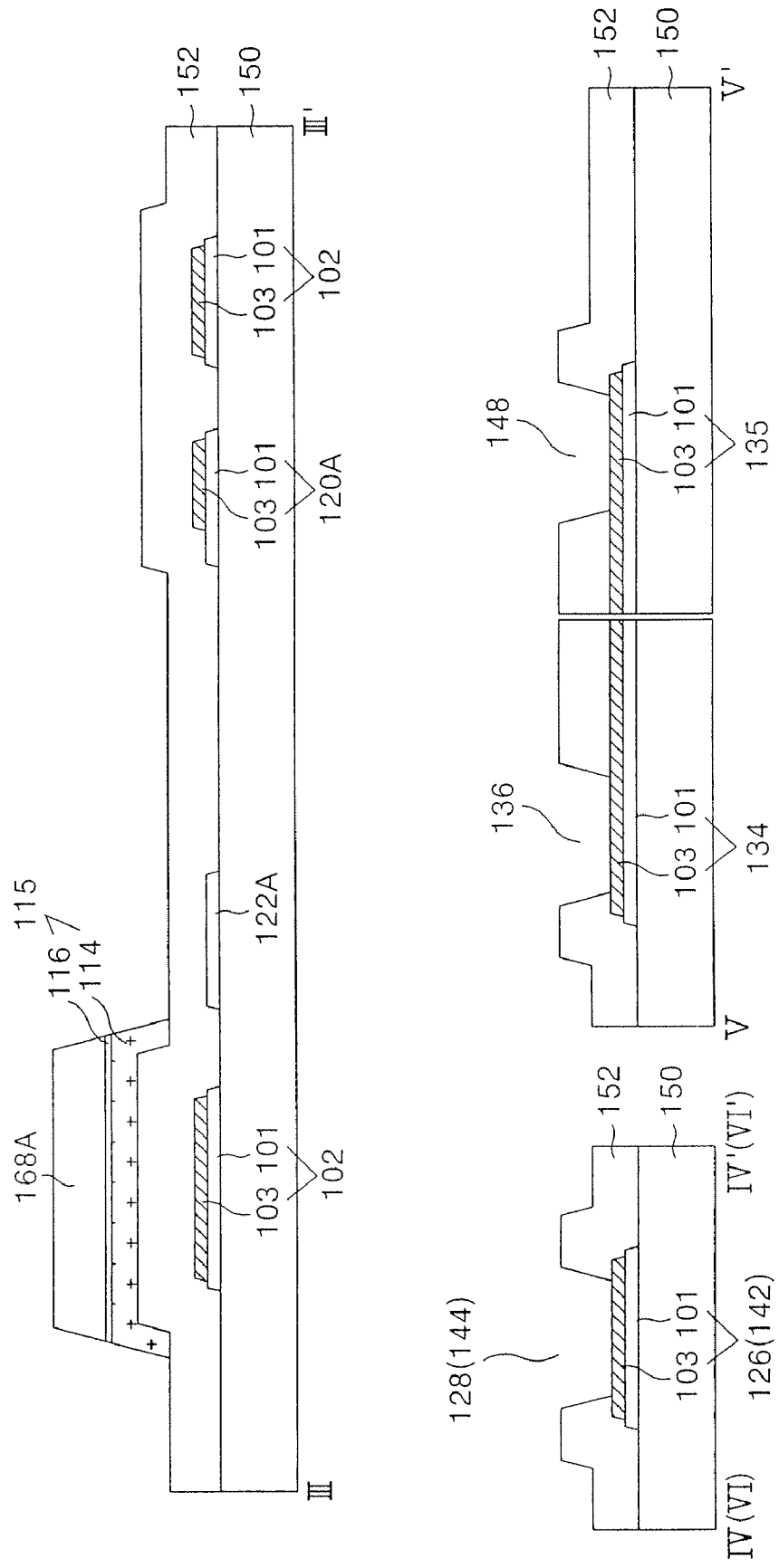

Referring to FIG. 9e, the amorphous silicon doped with an n+ or p+ impurity 107 and the amorphous silicon layer 105 are patterned by an etching process using the ashed second photo-resist pattern 168A as a mask to thereby provide the semiconductor pattern 115 including the active layer 114 and the ohmic contact layer 116.

Figure 9F:
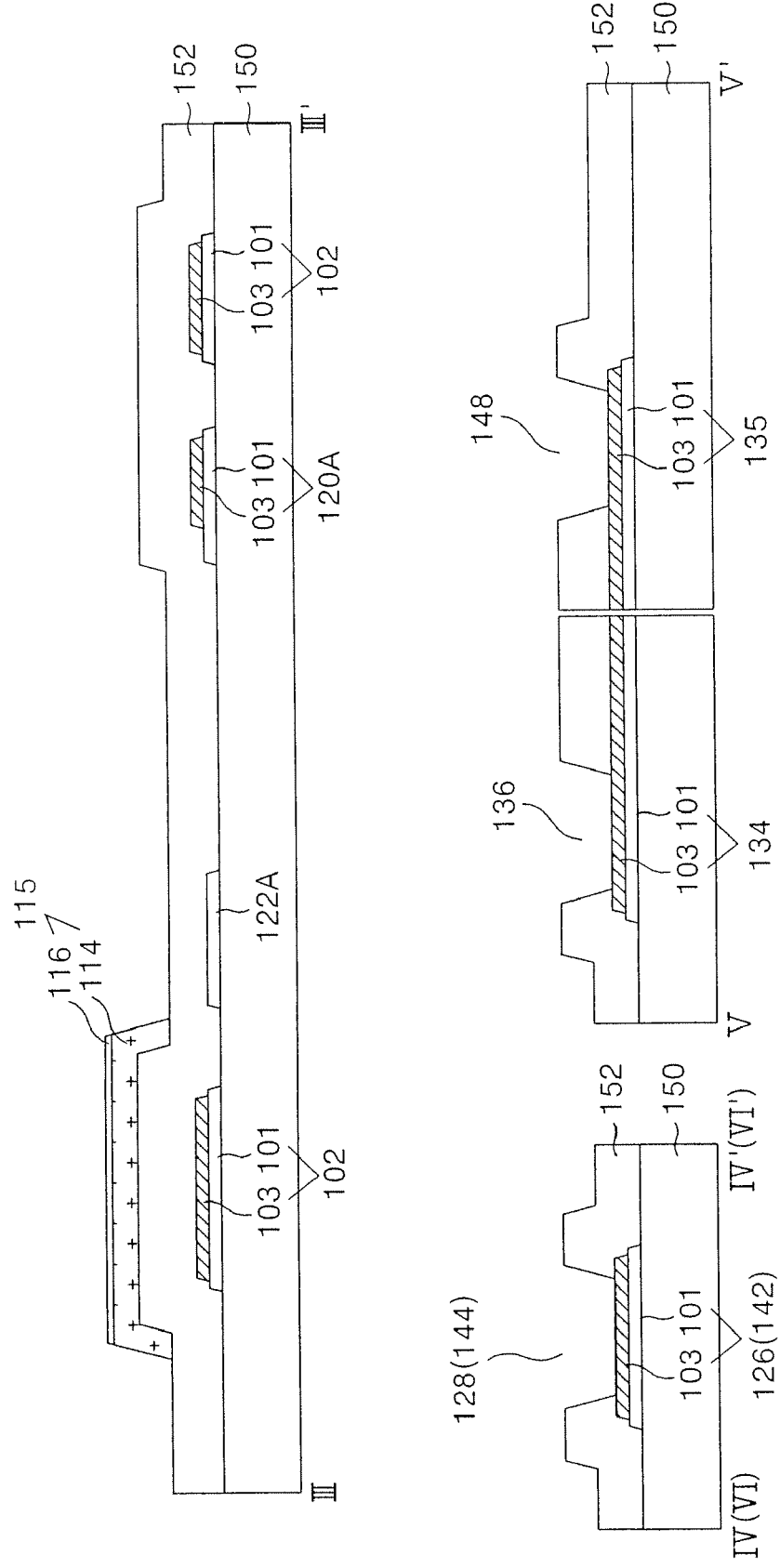

In FIG. 9f, the second photo-resist pattern 168A left on the semiconductor pattern 115 in FIG. 9e is removed by a stripping process.

Figure 10A:
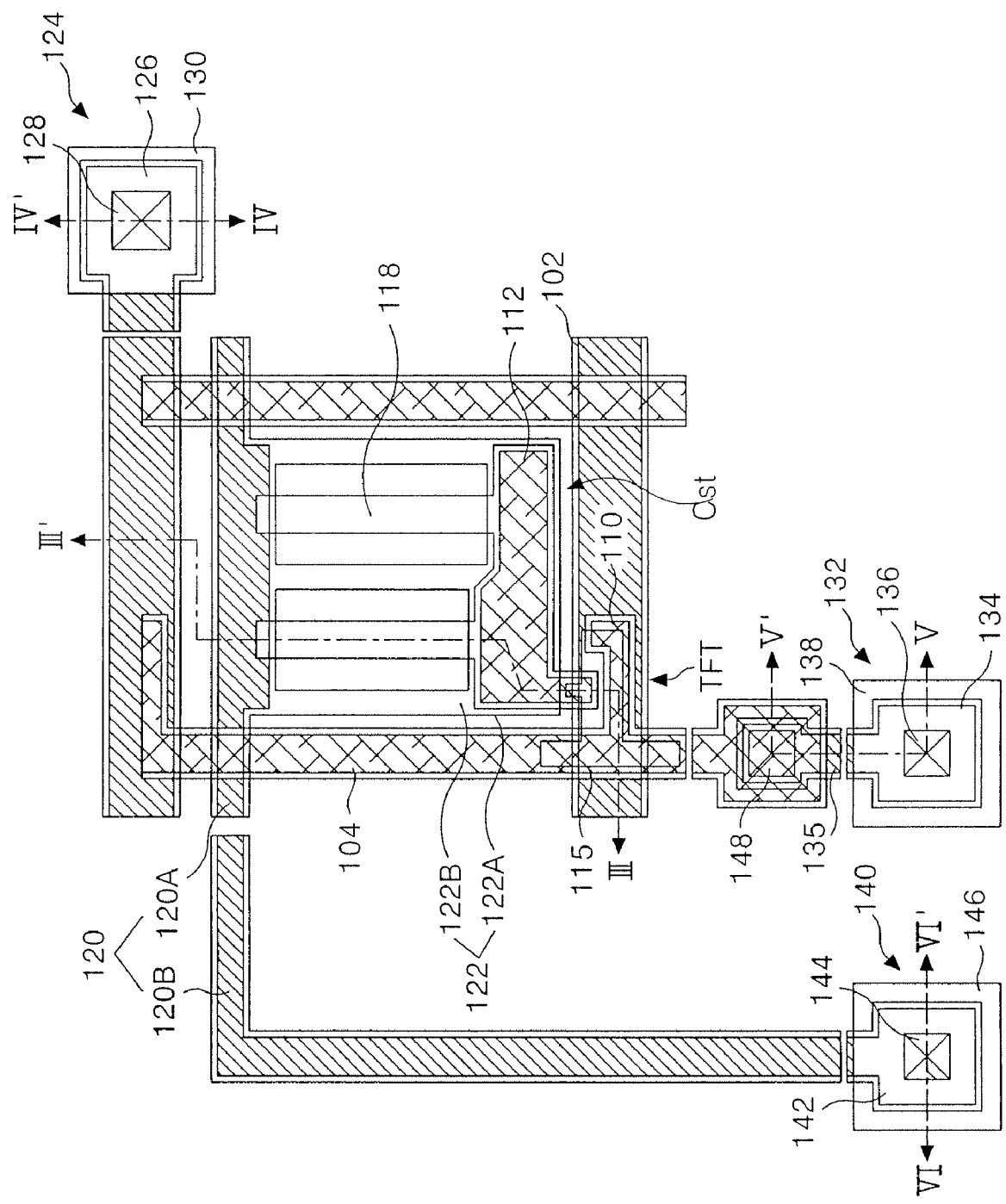

FIG. 10a and FIG. 10b are a plan view and a section view illustrating a third mask process in a method of fabricating the thin film transistor substrate of horizontal electric field applying type according to the embodiment of the present invention, respectively, and FIG. 12a to FIG. 12e are section views more specifically explaining the third mask process.

A third mask pattern group including the data line 104, the source electrode 110, the drain electrode 112, the pixel electrode 118, the upper gate pad electrode 130, the upper data pad electrode 138 and the upper common pad electrode 146 is formed on the gate insulating film 152 provided with the semiconductor pattern 115 by the third mask process. Herein, the third mask pattern group A including the data line 104, the source electrode 110 and the drain electrode 112 has a multiple-layer structure in which at least two conductive layers are formed. For convenience, a double-layer structure having third and fourth conductive layers 111 and 113 will be described. The third mask pattern group B including the pixel electrode 118, the upper gate pad electrode 130, the upper data pad electrode 138 and the upper common pad electrode 146 has a single-layer structure formed from the third conductive layer 111 of the third mask pattern group A. The third mask pattern group including the third mask pattern group having such a double-layer structure and the third mask pattern group B having such a single-layer structure is formed by the third mask process using a diffractive exposure mask or a half tone mask. Hereinafter, a case where the half tone mask is used as a third mask will be described.

Figure 11A:
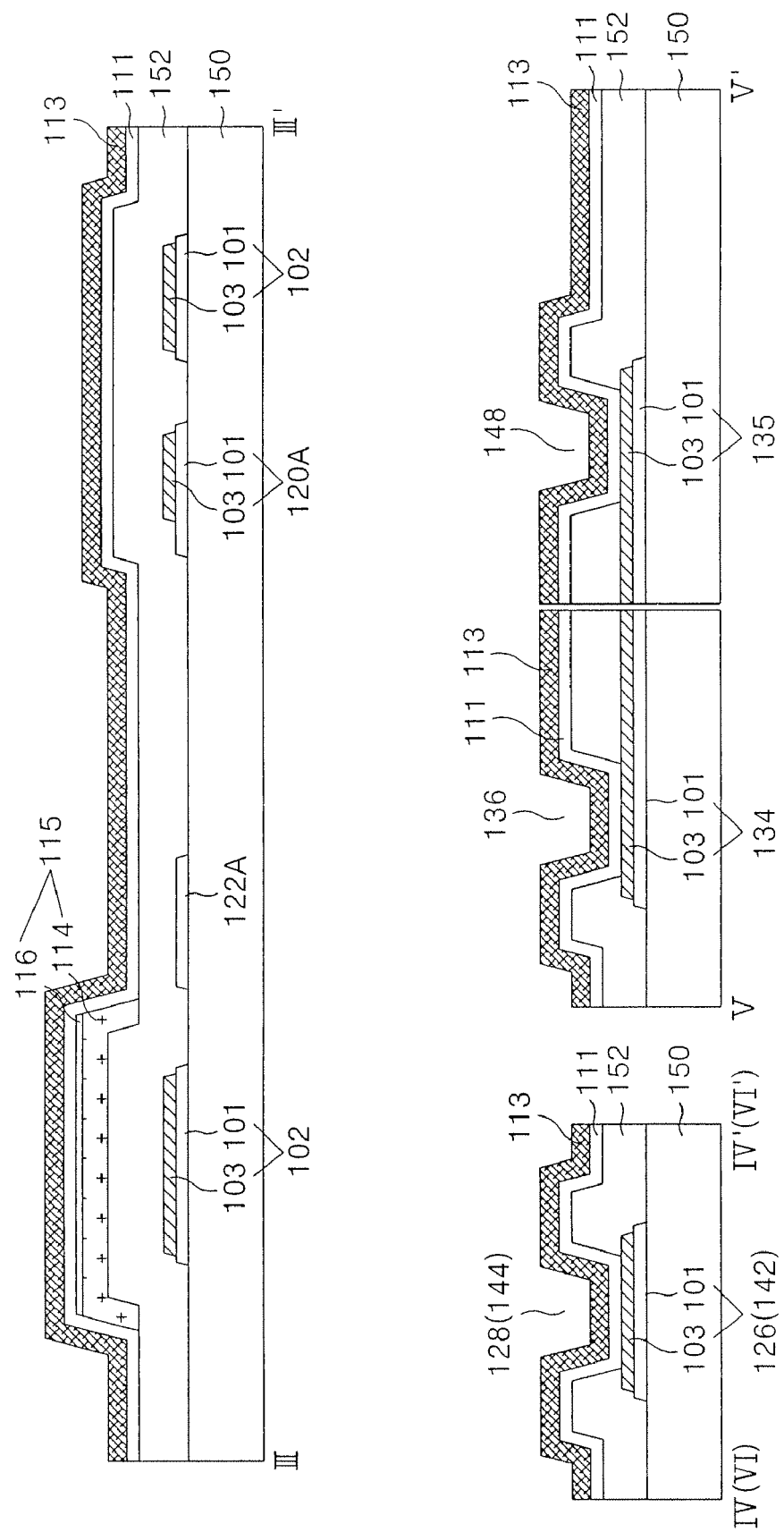

In FIG. 11a, the third and fourth conductive layers 111 and 113 are sequentially formed on the gate insulating film 152 provided with the semiconductor pattern 115 by a deposition technique such as the sputtering. The third conductive layer 111 is formed of a transparent conductive material such as ITO, TO, IZO or ITZO, etc, or an opaque metal having a strong corrosion resistance and a high strength such as Ti or W, etc. The fourth conductive layer 113 employs a single layer formed of a metal material such as Mo, Ti, Cu, AlNd, Al, Cr, a Mo-alloy, a Cu-alloy or an Al-alloy, or has a layered structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc.

In FIG. 11b, a third photo-resist pattern 182 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The third photo-resist pattern 182 includes a different thickness of third photo-resist patterns 182A and 182B and an aperture part is formed by photolithography using a half tone mask. In this case, the relatively thick third photo-resist pattern 182A is provided at a shielding area P1 of the third photo-resist overlapping with the shielding part of the half tone mask; the third photo-resist pattern 182B is thinner than the third photo-resist pattern 182A and is provided at a half tone exposure area P2 overlapping with the half-tone transmitting part; and the aperture part is provided at an full exposure area P3 overlapping with the full transmitting part.

Referring to FIG. 11c, the third and fourth conductive layers 111 and 113 are patterned by a wet-etching process using the third photo-resist pattern 182 as a mask to thereby provide a double-layer structure of the data line 104, the source electrode 110, the drain electrode 112, the pixel electrode 118, the upper gate pad electrode 130, the upper data pad electrode 138 and the upper common pad electrode 146. The data line 104 is overlapped with the data link 135 and is connected, via the fourth contact hole 148, to the data link 135. In this case, since the fourth conductive layer 113 is etched and then the third conductive layer 111 is etched by a different etchant, the third conductive layer 111 positioned at a lower portion than the upper fourth conductive layer 113 is over-etched to cause an under-cut area. Further, the ohmic contact layer 116 between the source electrode 110 and the drain electrode 112 is removed by an etching process using the source electrode 110 and the drain electrode 112 as a mask, for example, a dry-etching process, to thereby expose the active layer 114.

Figure 11D:
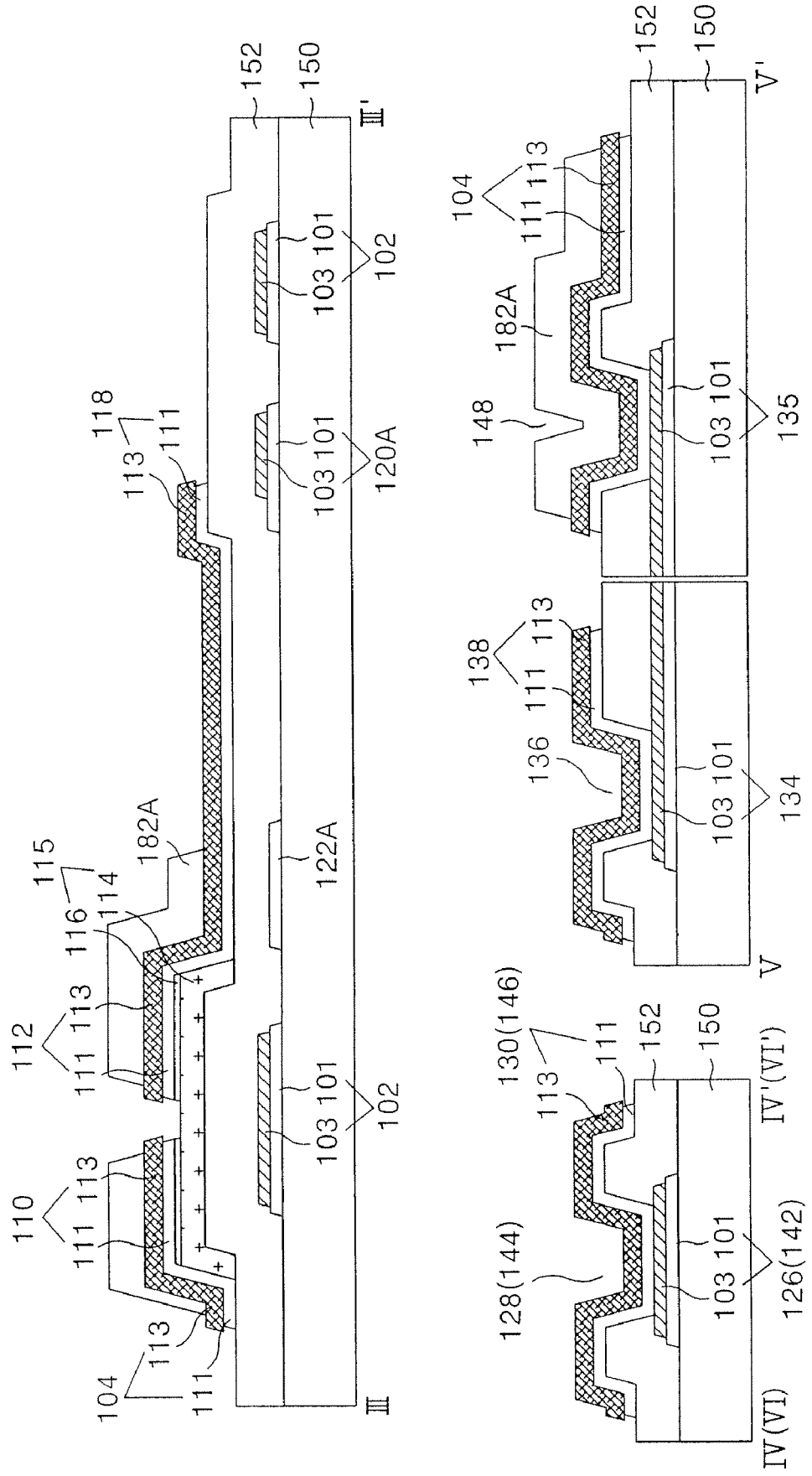

Referring to FIG. 11d, a thickness of the third photo-resist pattern 182A is thinned and the third photo-resist pattern 182B is removed by an ashing process. Such an ashing process may be performed within the same chamber as the dry-etching process for disconnecting the ohmic contact layer 116. Such a removal of the third photo-resist pattern 182B exposes the fourth conductive layer 113 of the pixel electrode 118, the upper gate pad electrode 130, the upper data pad electrode 138 and the upper common pad electrode 146. Further, the edge of the ashed third photo-resist pattern 182A is positioned at the inner side of the edge of the patterned fourth conductive layer 113.

Figure 11E:
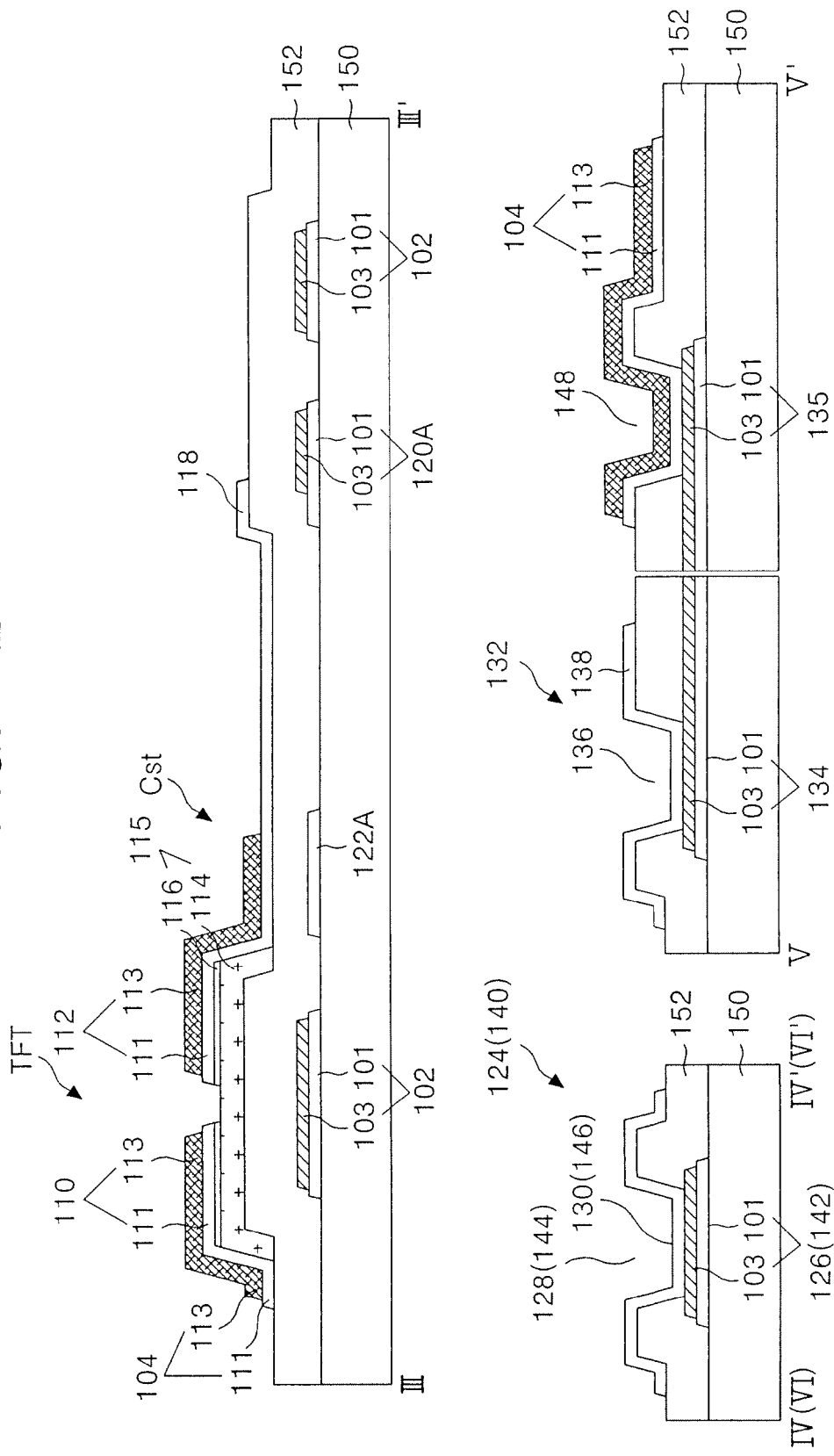

Referring to FIG. 11e, the fourth conductive layer 113 of the pixel electrode 118, the upper gate pad electrode 130, the upper data pad electrode 138 and the upper common pad electrode 146 are etched by an etching process using the ashed third photo-resist pattern 182A as a mask to thereby provide the pixel electrode 118, the upper gate pad electrode 130, the upper data pad electrode 138 and the upper common pad electrode 146 that have a single-layer structure of the third conductive layer 111. In this case, each side of the fourth conductive layer 113 exposed through the edge of the third photo-resist pattern 182A is again etched. Thus, the third and fourth conductive layers 111 and 113 of the data line 104, the source electrode 110 and the drain electrode 112 have a constant step coverage having a substantially rectangular or trapezoid shape. Further, the third photo-resist pattern 182A is removed by a stripping process.

The etching process of the third and fourth conductive layers 111 and 113 in the third mask process may be performed by wet-etching or dry-etching. But, the wet-etching is preferable.

As a result, the thin film transistor substrate of horizontal electric field applying type according to the embodiment of the present invention has an exposed structure of the data line 104, the source electrode 110, the pixel electrode 118 due to an absence of the protective film. However, all of them are positioned at an area sealed by the sealant, so that they can be sufficiently protected by the lower alignment film coated thereon as well as by the liquid crystal filled in the sealed area.

Figure 12:
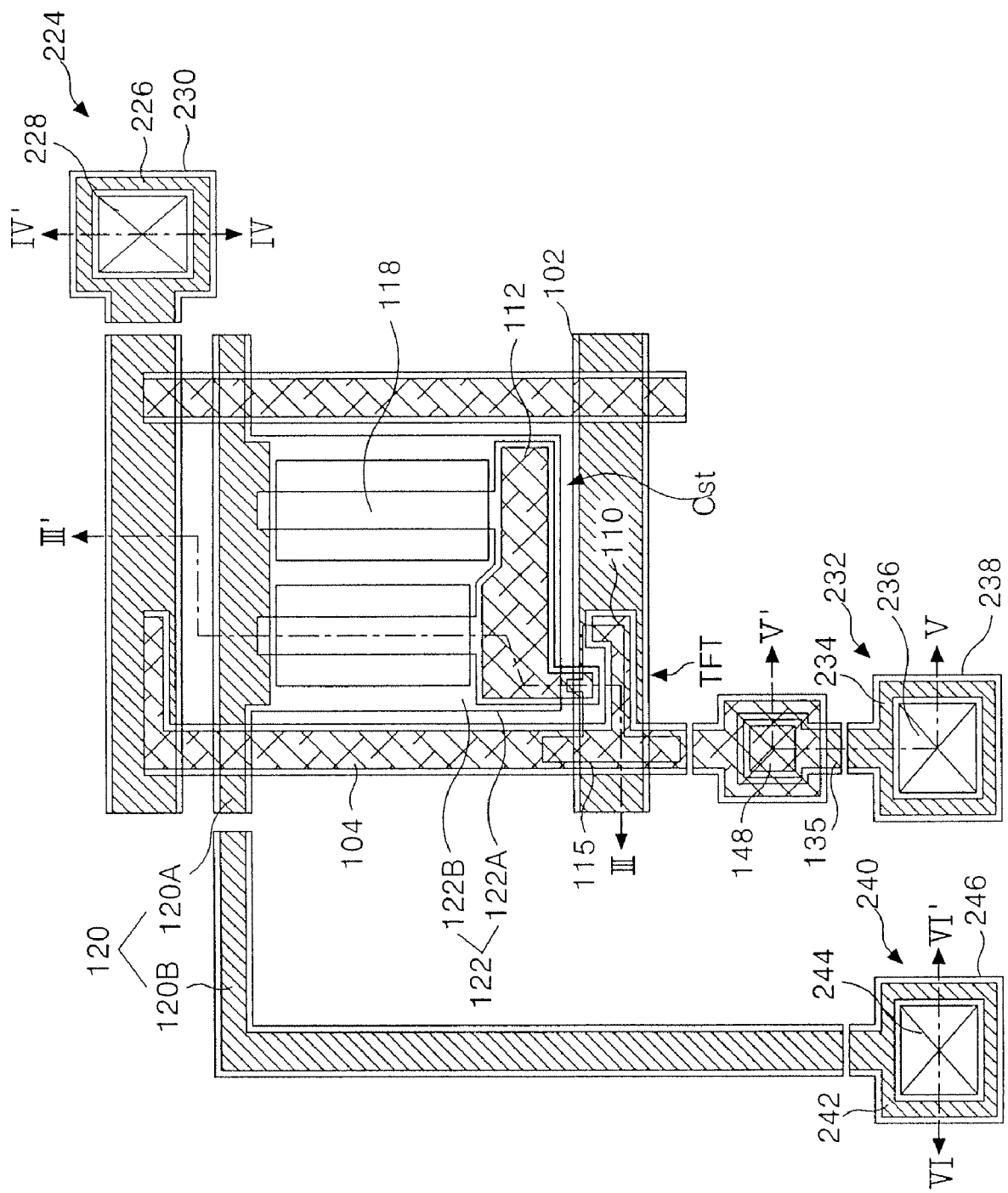
FIG. 12 is a plan view showing a portion of a thin film transistor substrate of a horizontal electric field applying type according to another embodiment of the present invention.

FIG. 12 is a plan view showing a portion of a thin film transistor substrate of horizontal electric field applying type according to the other embodiment of the present invention, and FIG. 13 is a section view of the thin film transistor substrate taken along the III-III', IV-IV', V-V', and VI-VI' lines in FIG. 12.

The thin film transistor substrate shown in FIG. 12 and FIG. 13 has the same elements as the thin film transistor substrate shown in FIG. 2 and FIG. 3 except that the gate pad 224, the data pad 232 and the common pad 240 are formed by the first mask process to thereby have a first mask pattern group structure. Therefore, an explanation as to the same elements will be omitted.

Referring to FIG. 12 and FIG. 13, the lower gate pad electrode 230, the lower data pad electrode 238, and the lower common pad electrode 246 are formed from the first conductive layer 101 of the first mask pattern group. The lower gate pad electrode 230, the lower data pad electrode 238, the lower common pad electrode 246 are exposed through the first to third contact holes 228, 236 and 244, respectively. The upper gate pad electrode 226, the upper data pad electrode 234 and the upper common pad electrode 242 are formed from the second conductive layer 103 of the first mask pattern group. The upper pad electrodes 226, 234 and 242 are left on the lower pad electrodes 230, 238 and 246 in such a manner to be not overlapped with the contact holes 228, 236 and 244, and hence are protected by the gate insulating film 152. For example, the upper pad electrode 226, 234 and 242 are left along the rims of the lower pad electrodes 230, 238 and 246, and hence are protected by the gate insulating film 152.

An exposed structure of the lower pad electrodes 230, 238 and 246 made through the upper pad electrodes 226, 234 and 242 is formed by etching out only the second conductive layer 103 in such a manner to expose the first conductive layer 101 by applying the half-tone exposure area P2 to the first mask process as described with reference to FIG. 6a to FIG. 7e.

As described above, in the thin film transistor substrate of horizontal electric field applying type and a fabricating method thereof according to the present invention, a single-layer structure of common electrode is formed, along with a multiple-layer structure of other first mask pattern group, with the aid of the first half tone (or diffractive exposure) mask.

Furthermore, in the thin film transistor substrate of horizontal electric field applying type and the fabricating method thereof according to the present invention, the semiconductor pattern and the contact hole are formed by utilizing the second half tone (or diffractive exposure) mask.

Moreover, in the thin film transistor substrate of horizontal electric field applying type and the fabricating method thereof according to the present invention, a single-layer structure of pixel electrode and upper pad electrodes are formed, along with a multiple-layer structure of other third mask pattern group, without any protective film with the aid of the third half tone (or diffractive exposure) mask.

Accordingly, the entire process can be simplified by the three-round mask process, so that it becomes possible to reduce the material cost and the equipment investment cost, etc. as well as to improve the productivity.

Furthermore, the liquid crystal panel to which the thin film transistor substrate of horizontal electric field applying type according to the present invention is applied, allows the data line, the source electrode, the drain electrode and the pixel electrode exposed due to an absence of the protective film to be sufficiently protected by the lower alignment film formed thereon or by the liquid crystal filled in the area sealed by the sealant. Also, the pads of the thin film transistor substrate have the same structure, and the data link connected to the data pad is connected, via the contact hole, to the data line within the area sealed by the sealant. Thus, it becomes possible to prevent an illumination problem, etc. caused by the absence of the protective film.

Moreover, according to the present invention, the common electrode and the pixel electrode are formed from the transparent conductive layer to thereby contribute to an aperture ratio, so that it becomes possible to improve an aperture ratio.

It will be apparent to those skilled in the art that various modifications and variation can be made in the present invention without departing from the sprit or scope of the invention. Thus, it is intended that the present invention cover the modifications and variations of this invention provided they come within the scope of the appended claims and their equivalents.

What is claimed is:

1. A liquid crystal display device, comprising:
   a gate line on a substrate;
   a data line crossing the gate line with a gate insulating film therebetween, wherein the data and gate lines define a pixel area;
   a thin film transistor including a gate electrode connected to the gate line, a source electrode connected to the data line, a drain electrode opposed to the source electrode and a semiconductor pattern defining a channel between the source electrode and the drain electrode;
   a common line on the substrate and substantially parallel to the gate line;
   a common electrode extended from the common line into the pixel area; and
   a pixel electrode extended from the drain electrode into the pixel area to form a horizontal electric field with the common electrode by the pixel electrode being parallel to the common electrode,
   wherein the gate line and the common line have a first conductive layer group having at least double conductive layers which have a lowermost layer of a transparent conductive material and an upper conductive layer of a metal material, and the common electrode is formed by an extension of the lowermost layer of the transparent conductive material of the common line; and
   the data line, the source electrode and the drain electrode have a second conductive layer group having at least double conductive layers which have a lowermost layer of a transparent conductive material and an upper conductive layer of a metal material, and the pixel electrode is formed by an extension of the lowermost layer of the transparent conductive material of the drain electrode.

2. The device as claimed in claim 1, further comprising:
a storage capacitor provided by an overlap of the drain electrode with a portion of the common electrode and the gate insulating film therebetween.

3. The device as claimed in claim 1, wherein the lowermost transparent conductive layers of the common electrode and the pixel electrode of the first and second conductive layer group includes at least one of ITO, TO, IZO and ITZO.

4. The device as claimed in claim 3, wherein the upper conductive layer of metal material of the first and second conductive layer groups have at least one of a single layer structure and at least a double layer structure of Mo, Ti, Cu, AlNd, Al, Cr, a Mo-alloy, a Cu-alloy and an Al-alloy.

5. The device as claimed in claim 4, further comprising:
a gate pad connected to the gate line;
a data pad connected to the data link; and
a common pad connected the common line,
wherein each of the gate pad, the data pad and the common pad is formed of the first conductive layer group.

6. The device as claimed in claim 5, wherein each of the gate pad, the data pad and the common pad further includes:
a lower pad electrode formed of the lowermost layer of the first conductive layer group;
an upper pad electrode formed of the upper layer of the first conductive layer group on the lower electrode; and
a contact hole passing through the gate insulating film to expose the lower pad electrode.

7. The device as claimed in claim 6, wherein the upper pad electrode is not overlapped with the contact hole to be protected by the gate insulating film.

8. The device as claimed in claim 1, further comprising a data link formed of the first conductive layer group to be connected, via a contact hole passing through the gate insulating film, to the data line.

9. The device as claimed in claim 8, further comprising:
a gate pad connected to the gate line;
a data pad connected to the data link; and
a common pad connected to the common line,
wherein each of the gate pad, the data pad and the common pad includes:
a lower pad electrode formed of the first conductive layer group;
a contact hole passing through the gate insulating film to expose the lower pad electrode; and
an upper pad electrode formed of the lowermost layer of the second conductive layer group to be connected, via the contact hole, to the lower pad electrode.

10. The device as claimed in claim 9, wherein the upper pad electrode of the data pad is electrically connected to the lowermost layer of the data line.

11. The device as claimed in claim 8, wherein the contact hole is positioned at an area to be sealed by a sealant upon joint of another substrate.

12. The device as claimed in claim 8, further comprising an alignment film on the data line, the source electrode, the drain electrode, the pixel electrode and the contact hole.

13. The device as claimed in claim 1, wherein the data line, the source electrode, the drain electrode and the pixel electrode are positioned at an area to be sealed by a sealant upon joint of another substrate.

14. The device as claimed in claim 1, further comprising an alignment film on the data line, the source electrode, the drain electrode and the pixel electrode.

15. The device as claimed in claim 1, wherein the semiconductor pattern is formed at a position to be provided with the thin film transistor.

16. The device as claimed in claim 1, wherein each of the first and second conductive layer groups has a structure having the upper conductive layer made of a copper metal layer or a copper alloy layer.

17. The device as claimed in claim 1, wherein at least one of the first and second conductive groups has step coverage having a stepwise shape.

18. The device as claimed in claim 1, wherein at least two layers of the semiconductor pattern, the source electrode, the drain electrode and the pixel electrode have step coverage having a substantially rectangular stepwise shape.

* * * * *